United States Patent
Groh et al.

(10) Patent No.: US 11,713,272 B2
(45) Date of Patent: Aug. 1, 2023

(54) SYSTEM AND METHODS FOR PROCESSING AN OPTICAL FIBER PREFORM

(71) Applicant: CORNING INCORPORATED, Corning, NY (US)

(72) Inventors: Raymond David Groh, Wilmington, NC (US); Joseph Leroy Morse, Little River, SC (US); Bradley Kent Shepard, Wilmington, NC (US); Ian Anthony Smith, Kure Beach, NC (US); Eric Wade Thornton, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 673 days.

(21) Appl. No.: 16/799,185

(22) Filed: Feb. 24, 2020

(65) Prior Publication Data

US 2020/0283329 A1 Sep. 10, 2020

Related U.S. Application Data

(60) Provisional application No. 62/813,951, filed on Mar. 5, 2019.

(51) Int. Cl.
 *C03B 37/012* (2006.01)
 *F27B 5/00* (2006.01)
 *F27B 5/13* (2006.01)

(52) U.S. Cl.
 CPC .... *C03B 37/01257* (2013.01); *C03B 37/0124* (2013.01); *C03B 37/0126* (2013.01); *F27B 5/00* (2013.01); *F27B 5/13* (2013.01)

(58) Field of Classification Search
 CPC ............... C03B 37/01257; C03B 37/0126
 See application file for complete search history.

(56) References Cited

U.S. PATENT DOCUMENTS

| 4,278,459 | A | | 7/1981 | Partus |
| 4,378,987 | A | | 4/1983 | Miller et al. |
| 4,629,485 | A | * | 12/1986 | Berkey ............ C03B 37/01446 65/427 |
| 4,708,726 | A | | 11/1987 | Miller et al. |

(Continued)

FOREIGN PATENT DOCUMENTS

| AU | 07422/24 B2 | 12/2001 |
| CA | 2332123 A1 | 12/1999 |

(Continued)

OTHER PUBLICATIONS

International Search Report and Written Opinion of the International Searching Authority; PCT/US2020/017674; dated May 12, 2020; 9 Pages; European Patent Office.

*Primary Examiner* — Erin Snelting
(74) *Attorney, Agent, or Firm* — Kevin L. Bray

(57) ABSTRACT

A system and methods are described herein for preheating a preform in a preheater furnace and then transferring the preheated preform to a consolidation furnace for chemical treatment and sintering the preform into a clear glass which can be drawn into optical fiber. In addition, the preheater furnace is described herein which is configured to heat the preform per a predetermined heat-profile until the preform is uniformly heated to a temperature above 1000° C.

12 Claims, 12 Drawing Sheets

(56) References Cited

U.S. PATENT DOCUMENTS

| | | | |
|---|---|---|---|
| 4,810,276 A | 3/1989 | Gilliland | |
| 4,969,941 A | 11/1990 | Kyoto et al. | |
| 5,656,057 A | 8/1997 | Brown et al. | |
| 5,685,889 A | 11/1997 | Ohga et al. | |
| 5,873,921 A | 2/1999 | Hirota et al. | |
| 6,042,755 A | 3/2000 | Matsumoto | |
| 6,053,013 A | 4/2000 | Oh et al. | |
| 6,418,757 B1 | 7/2002 | Berkey et al. | |
| 6,813,907 B2 | 11/2004 | Dawes et al. | |
| 7,506,521 B2 | 3/2009 | Bookbinder et al. | |
| 9,290,405 B2 * | 3/2016 | Harper | C03B 37/01446 |
| 9,586,853 B2 | 3/2017 | Billings et al. | |
| 9,650,281 B2 | 5/2017 | Bookbinder et al. | |
| 9,656,902 B2 | 5/2017 | Adigrat et al. | |
| 9,676,658 B2 | 6/2017 | Harper et al. | |
| 9,873,629 B2 | 1/2018 | Dawes et al. | |
| 9,878,943 B2 | 1/2018 | Bookbinder et al. | |
| 9,902,643 B2 | 2/2018 | Shinada | |
| 9,919,946 B2 | 3/2018 | Billings et al. | |
| 2003/0070452 A1 | 4/2003 | Goudeau et al. | |
| 2003/0221459 A1 | 12/2003 | Walczak | |
| 2004/0107596 A1 | 6/2004 | Bookbinder et al. | |
| 2006/0137397 A1 | 6/2006 | Bookbinder et al. | |
| 2007/0193306 A1 | 8/2007 | Yoshida et al. | |
| 2015/0329403 A1 * | 11/2015 | Adigrat | C03B 37/01446 65/508 |
| 2016/0009588 A1 | 1/2016 | Bookbinder et al. | |
| 2016/0009589 A1 | 1/2016 | Billings et al. | |
| 2016/0318792 A1 | 11/2016 | Suganuma et al. | |
| 2017/0129800 A1 | 5/2017 | Billings et al. | |
| 2017/0197878 A1 | 7/2017 | Bookbinder et al. | |
| 2018/0084609 A1 | 3/2018 | Hempstead | |
| 2018/0148366 A1 | 5/2018 | Dawes et al. | |

FOREIGN PATENT DOCUMENTS

| | | |
|---|---|---|
| CN | 1210986 A | 3/1999 |
| CN | 103214181 B | 9/2015 |
| CN | 104710106 B | 12/2017 |
| CN | 107540204 A | 1/2018 |
| CN | 107790512 A | 3/2018 |
| DE | 69815853 T2 | 12/2003 |
| EP | 744383 B1 | 9/1999 |
| JP | 56059635 A | 5/1981 |
| JP | 62119135 A | 5/1987 |
| JP | 62119136 A | 5/1987 |
| JP | 62162648 A | 7/1987 |
| JP | 62167234 A | 7/1987 |
| JP | 63060124 A | 3/1988 |
| JP | 63056178 B2 | 11/1988 |
| JP | 0369526 A | 3/1991 |
| JP | 6099163 B2 | 12/1994 |
| JP | 10130032 A | 5/1998 |
| JP | 3234871 B2 | 12/2001 |
| JP | 2003261336 A | 9/2003 |
| JP | 03955464 B2 | 8/2007 |
| KR | 704070 B1 | 4/2007 |
| WO | 2017181649 A1 | 10/2017 |

* cited by examiner

SYSTEM AND METHODS FOR PROCESSING AN OPTICAL FIBER PREFORM

This application claims the benefit of priority U.S. Provisional Application Ser. No. 62/813,951 filed on Mar. 5, 2019, the content of which is relied upon and incorporated herein by reference in its entirety.

TECHNICAL FIELD

The present disclosure relates to a system and methods for preheating a preform in a preheater furnace and then transferring the preheated preform to a consolidation furnace for chemical treatment and sintering the preform into a clear glass which can be drawn into optical fiber. In addition, the present disclosure relates to the preheater furnace which is configured to heat the preform per a predetermined heat-profile until the preform is uniformly heated to a temperature above 1000° C.

BACKGROUND

The traditional consolidation process utilizes a consolidation furnace to heat-up of a porous preform and sinter to form a fully dense clear preform that is capable of being drawn into optical fiber. The porous preform is typically a porous silica preform and the consolidation process typically includes drying and doping of the porous silica preform before and/or during the sintering process. Drying and doping are chemical processes that entail exposing the porous silicon preform to a drying agent (e.g. $Cl_2$) and a doping precursor (e.g. $SiCl_4$ or $SiF_4$). In order for the chemical reactions accompanying drying and doping to proceed efficiently, the porous silica preform must be heated to a sufficiently high temperature. The threshold temperature for efficient reaction of common drying agents and doping precursors is a temperature above 1000° C. The threshold temperature is achieved at least at the surface of the porous silica preform and preferably is achieved throughout the volume of the porous silica preform. Due to the typical physical dimensions (e.g. 2 meters long with a diameter of 240 mm) and the low thermal conductivity (e.g. 0.1 to 0.4 W/m-K) of porous silica preforms, a time of several hours is typically needed to heat the porous silica preform uniformly to a temperature above 1000° C.

Referring to FIG. 1 (PRIOR ART) there is a graph which shows the heat-up profile for an exemplary single-mode overclad porous silica preform. More specifically, the graph shows a radial temperature profile for a porous silica preform having a density of 0.46 $g/cm^3$ upon heating in a furnace at a temperature of 1275° C. The radial position of 0 mm corresponds to the center of the porous silica preform and the radial position of 120 mm corresponds to the outer surface of the porous silica preform. The different lines of the graph show the radial temperature profile at different times of heating. Under these conditions, it can be seen that it takes over four hours for the center of the porous silica preform to heat from room temperature to the threshold temperature of about 1000° C. or higher needed for efficient drying and doping processes. Once the temperature of at least the outer surface of the porous silica preform is brought to a threshold temperature of about 1000° C. or higher, drying and doping can be completed in times on the order of tens of minutes. Accordingly, the processing time for consolidation of porous silica preforms is limited mainly by the time needed to heat the porous silica preform to a temperature sufficiently high to accomplish drying and doping efficiently. As a result, the rate of the overall consolidation process could be improved if the porous silica preform could be heated more quickly within the consolidation furnace. One method to decrease the heating time is to simply increase the temperature in the consolidation furnace. However, this approach is complicated by the fact that higher furnace temperatures lead to premature densification of the porous silica preform. Premature densification reduces the porosity of the porous silica preform and inhibits penetration and dispersion of drying agents and doping precursors within the porous silica preform. As a result, non-uniformities in drying and doping occur and the composition of the consolidated preform varies with position. In view of at least the foregoing, it can be readily seen that there is a need to improve the traditional consolidation process to reduce the process time while preserving compositional uniformity. This need and other needs are addressed herein by the present disclosure.

SUMMARY

A system, a preheater furnace, and various methods which address the aforementioned need are described in the independent claims of the present disclosure. Advantageous embodiments of the system, the preheater furnace, and the various methods are described in the dependent claims.

In one aspect, the present disclosure provides:
A system comprising:
 a preheater furnace configured to receive a porous preform and to heat the porous preform to form a preheated preform, the preheated preform having an outer surface; and
 a transfer stage configured to transfer the preheated preform from the preheater furnace to a consolidation furnace configured to sinter the preheated preform to form a consolidated preform, the transfer including removing the preheated preform with the outer surface at a first temperature from the preheater furnace and inserting the preheated preform with the outer surface at a second temperature into the consolidation furnace, the first temperature exceeding 1000° C. and the second temperature being greater than room temperature and less than the first temperature.

In one aspect, the present disclosure provides:
A preheater furnace configured to heat a preform, the preheater furnace comprising:
 a body having an automated door attached thereto which when opened provides access to an interior space of the body and when closed prevents access to the interior space of the body;
 one or more heating elements and associated insulation located within the body, wherein the one or more heating elements are configured to radiate heat to heat the preform while the preform is located within the interior space of the body;
 a box muffle configured to prevent the one or more heating elements and the insulation from contaminating an outer surface of the preform while the preform is located within the interior space of the body;
 a rotation-translation mechanism configured to rotate the preform while the preform is located within the interior space of the body; and,
 wherein the rotation-translation mechanism is further configured to be retracted to move the preform into the interior space of the body and further configured to be extended to move the preform out from the interior space of the body.

In one aspect, the present disclosure provides:
A method of processing an optical fiber preform, comprising:

loading a porous preform into a preheater furnace;

heating the porous preform in the preheater furnace to form a preheated preform, the preheated preform having an outer surface at a first temperature, the first temperature exceeding 1000° C.;

transferring the preheated preform from the preheater furnace to a consolidation furnace, the outer surface of the preheated preform cooling to a second temperature during the transferring, the transferring including inserting the preheated preform with the outer surface at the second temperature into the consolidation furnace, the second temperature being greater than room temperature and less than the first temperature.

In one aspect, the present disclosure provides a system comprising a preheater furnace and a consolidation furnace. The preheater furnace is configured to receive a preform and further configured to heat the preform per a predetermined heat-profile until the preform is uniformly heated to a temperature above 1000° C. The consolidation furnace is configured to receive the preform that was heated in the preheater furnace and further configured to chemically dry, dope and sinter the preform.

In another aspect, the present disclosure provides a method comprising the steps of: (a) loading a preform into a preheater furnace; (b) heating the preform in the preheater furnace per a predetermined heat-profile until the preform is uniformly heated to a temperature above 1000° C.; (c) transferring the preform which has been uniformly heated to a consolidation furnace; and, (d) chemically drying, doping, and sintering the preform within the consolidation furnace.

In yet another aspect, the present disclosure provides a preheater furnace configured to heat a preform. The preheater furnace comprising: (a) a body having an automated door attached thereto which when opened provides access to an interior space of the body and when closed prevents access to the interior space of the body; (b) one or more heating elements and associated insulation located within the body, wherein the one or more heating elements are configured to radiate heat to heat the preform while the preform is located in the interior space of the body; (c) a box muffle configured to prevent the one or more heating elements and the insulation from contaminating an outer surface of the preform while the preform is located within the interior space of the body; (d) a rotation-translation mechanism configured to rotate the preform while the preform is located within the interior space of the body; and (e) the rotation-translation mechanism is further configured to be retracted to move the preform into the interior space of the body and further configured to be extended to move the preform out from the interior space of the body.

In still yet another aspect, the present disclosure provides a method comprising the steps of: (a) moving an automated robot into a predetermined position; (b) initiating an unload process for the automated robot in which the automated robot removes a consolidated preform from a consolidation furnace; (c) unloading the consolidated preform from the automated robot to an unload station; (d) unloading by the automated robot a heated preform from a preheater furnace and transferring the heated preform to a consolidation furnace; (e) operating the consolidation furnace to chemically dry, dope, and sinter the heated preform; (f) picking up a soot preform by the automated robot from a load station and loading the soot preform into the preheater furnace; (g) operating the preheater furnace to heat the soot preform therein per a predetermined heat-profile until the soot preform is uniformly heated to a temperature above 1000° C.; (h) moving the automated robot to a stowed position S and disengaging a cell interlock; (i) initiating a load countdown; (j) enabling an operator to enter an area associated with the preheater furnace and the consolidation furnace; (k) enabling the operator to transfer the consolidated preform from the unload station to a hot case; (l) enabling the operator to load the load station with another soot preform; and, (m) completing the consolidation of the preform located in the consolidation furnace and returning to the first moving step.

Additional aspects of the disclosure will be set forth, in part, in the detailed description, figures and any claims which follow, and in part will be derived from the detailed description, or can be learned by practice of the disclosure. It is to be understood that both the foregoing general description and the following detailed description are exemplary and explanatory only and are not restrictive of the disclosure as disclosed.

BRIEF DESCRIPTION OF THE DRAWINGS

A more complete understanding of the present disclosure may be had by reference to the following detailed description when taken in conjunction with the accompanying drawings wherein.

DETAILED DESCRIPTION

Figure 1:
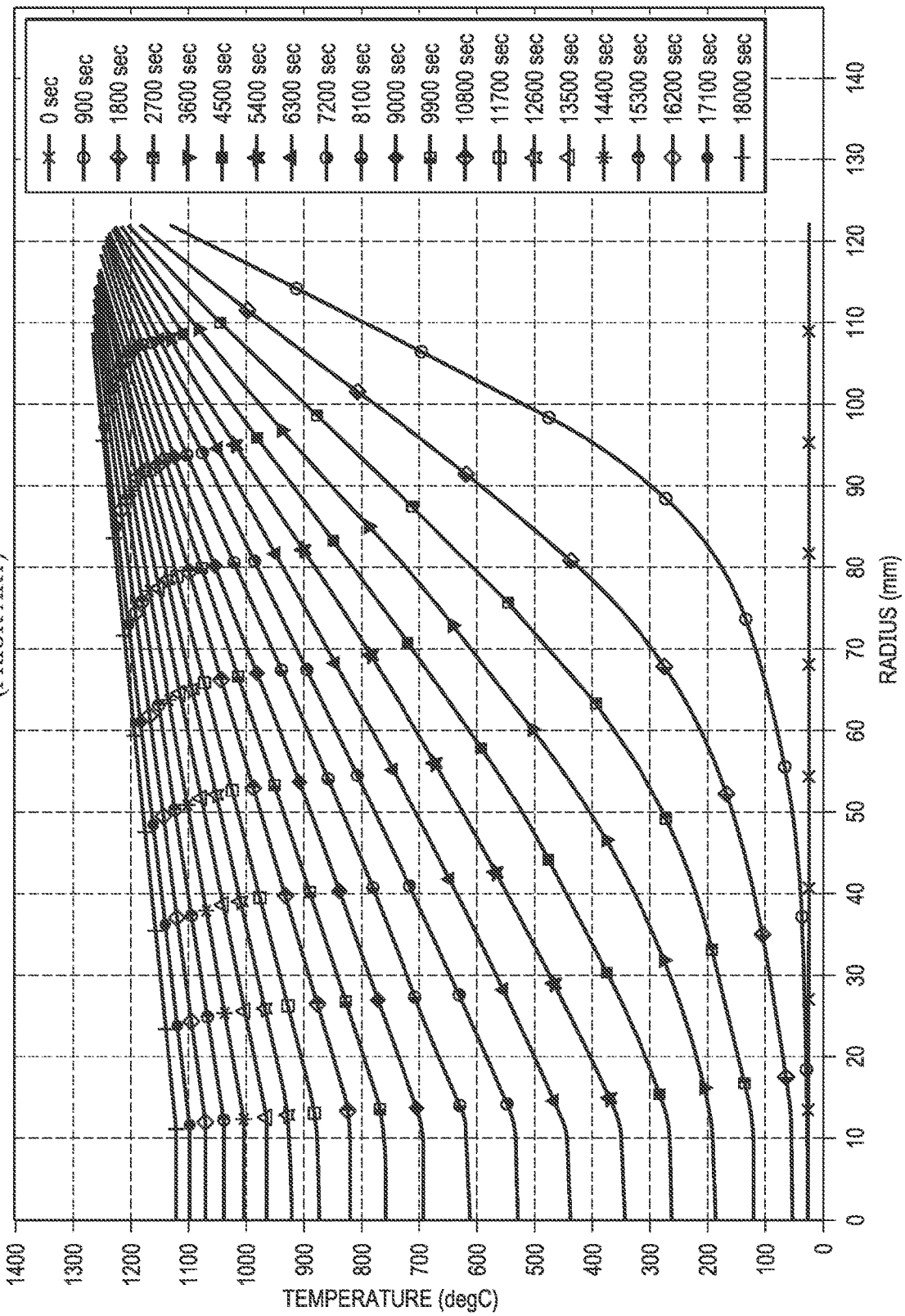
FIG. 1 (PRIOR ART) is a graph which shows the radial temperature profile for an exemplary porous silica overclad preform as a function of time upon heating at 1275° C.

The present disclosure provides systems and methods for processing preforms used to draw optical fibers. As described in further detail below, the systems and methods include placing a porous preform in a preheating furnace to heat the preform to a threshold temperature, removing the preform from the preheating furnace while the preform is at the threshold temperature, transferring the preform to a consolidation furnace, and processing the preform in the consolidation furnace. The porous preform is preferably formed of silica soot and the threshold temperature is preferably a temperature above 1000° C. and less than a temperature at which sintering occurs. Processing in the consolidation furnace includes sintering the preform and one or both of drying and doping the preform.

In the present disclosure, the following terms are used and have the following meanings:

"Porous preform" refers to a preform formed in a soot deposition process. A porous preform is a soot body that is in a state corresponding to or closely corresponding to the state at the time of deposition. When the porous preform consists of silica or primarily of silica, the bulk density of the porous preform is less than 0.70 $g/cm^3$, or less than 0.65 $g/cm^3$, or less than 0.60 $g/cm^3$, or less than 0.55 $g/cm^3$, or less than 0.50 $g/cm^3$, or less than 0.45 $g/cm^3$, or in the range from 0.35 $g/cm^3$-0.70 $g/cm^3$, or in the range from 0.40 $g/cm^3$-0.65 $g/cm^3$, or in the range from 0.45 $g/cm^3$-0.60 $g/cm^3$. When the porous preform consists of silica or primarily of silica, the surface density of the porous preform is less than 0.70 $g/cm^3$, or less than 0.65 $g/cm^3$, or less than 0.60 $g/cm^3$, or less than 0.55 $g/cm^3$, or less than 0.50 $g/cm^3$, or less than 0.45 $g/cm^3$, or in the range from 0.35 $g/cm^3$-0.70 $g/cm^3$, or in the range from 0.40 $g/cm^3$-0.65 $g/cm^3$, or in the range from 0.45 $g/cm^3$-0.60 $g/cm^3$. The porous preform has a mass greater than 10 kg, or greater than 25 kg, or greater than 40 kg, or greater than 55 kg, or in the range from 10 kg-75 kg, or in the range from 20 kg-65 kg, or in the range from 30 kg-55 kg.

"Preheated preform" refers to the preform produced by processing the porous preform in a preheating furnace operated at a temperature above 1000° C. and without exposure to a temperature of 1350° C. or greater. When the preheated preform consists of silica or primarily of silica, the preheated preform has an outer surface with a temperature greater than 1000° C. and less than 1200° C., or greater than 1050° C. and less than 1200° C., or greater than 1100° C. and less than 1200° C., or greater than 1150° C. and less than 1200° C., or in the range from 1000° C.-1200° C., or in the range from 1050° C.-1175° C. When the porous preform consists of silica or primarily of silica, the bulk density of the porous preform is less than 0.70 $g/cm^3$, or less than 0.65 $g/cm^3$, or less than 0.60 $g/cm^3$, or less than 0.55 $g/cm^3$, or less than 0.50 $g/cm^3$, or less than 0.45 $g/cm^3$, or in the range from 0.35 $g/cm^3$-0.70 $g/cm^3$, or in the range from 0.40 $g/cm^3$-0.65 $g/cm^3$, or in the range from 0.45 $g/cm^3$-0.60 $g/cm^3$. When the porous preform consists of silica or primarily of silica, the surface density of the porous preform is less than 0.70 $g/cm^3$, or less than 0.65 $g/cm^3$, or less than 0.60 $g/cm^3$, or less than 0.55 $g/cm^3$, or less than 0.50 $g/cm^3$, or less than 0.45 $g/cm^3$, or in the range from 0.35 $g/cm^3$-0.70 $g/cm^3$, or in the range from 0.40 $g/cm^3$-0.65 $g/cm^3$, or in the range from 0.45 $g/cm^3$-0.60 $g/cm^3$. In one embodiment, the surface density of the preheated preform is greater than the bulk density of the preheated preform. In another embodiment, the surface density of the preheated preform is equal to the bulk density of the preheated preform.

"Consolidated preform" refers to the preform produced by processing the preheated preform at a temperature of 1300° C. or higher. In the context of the present disclosure, a consolidated preform is formed by processing a preheated preform in a consolidation furnace. A consolidated preform is a transparent or vitrified glass body suitable for use in an optical fiber draw process. When the consolidated preform consists of silica or doped silica, the bulk density of the consolidated preform is greater than 1.90 $g/cm^3$, or greater than 2.00 $g/cm^3$, or greater than 2.05 $g/cm^3$, or greater than 2.10 $g/cm^3$, or greater than 2.15 $g/cm^3$, or greater than 2.20 $g/cm^3$, or greater than 2.25 $g/cm^3$, or in the range from 1.90 $g/cm^3$-2.35 $g/cm^3$, or in the range from 1.95 $g/cm^3$-2.30 $g/cm^3$, or in the range from 2.00 $g/cm^3$-2.25 $g/cm^3$, or in the range from 2.05 $g/cm^3$-2.20 $g/cm^3$. When the consolidated preform consists of silica or doped silica, the surface density of the consolidated preform is greater than 1.90 $g/cm^3$, or greater than 2.00 $g/cm^3$, or greater than 2.05 $g/cm^3$, or greater than 2.10 $g/cm^3$, or greater than 2.15 $g/cm^3$, or greater than 2.20 $g/cm^3$, or greater than 2.25 $g/cm^3$, or in the range from 1.90 $g/cm^3$-2.35 $g/cm^3$, or in the range from 1.95 $g/cm^3$-2.30 $g/cm^3$, or in the range from 2.00 $g/cm^3$-2.25 $g/cm^3$, or in the range from 2.05 $g/cm^3$-2.20 $g/cm^3$.

"Sintering" refers to heating a porous preform or a preheated preform to a temperature sufficient to induce densification. Densification corresponds to loss of porosity and a transition to a non-porous state. When the porous preform or preheated preform consists of silica or primarily of silica, sintering refers to heating the porous preform or preheated preform to a temperature above 1350° C.

"Surface density" refers to the average density of a preform in the region of the preform extending from the outer surface to a depth of 5 mm.

"Bulk density" refers to the average density of a preform throughout the entirety of its volume.

"Radial position", "radius", or the radial coordinate "r" refers to radial position relative to the centerline (r=0) of a preform.

The system 200 and methods 1100 and 1200 of the present disclosure address the aforementioned need of the traditional consolidation process by preheating a porous preform 208 (e.g., a porous silica preform 208) in a preheater furnace 202 to form a preheated preform 208 and then transferring the preheated preform 208 to a consolidation furnace 206 for chemical treatment (e.g. drying and/or doping) and sintering to form a consolidated preform 208. The system 200 and methods 1100 and 1200 involve heating of the porous preform 208 in the preheater furnace 202 to form the preheated preform 208. The preheater furnace 202 is spaced apart from and separate from the consolidation furnace 206.

More specifically, the system 200 and methods 1100 and 1200 involve the heating of the surface of porous preform a 208 to a threshold temperature (e.g., above 1000° C., such as approximately 1125° C.) in the preheater furnace 202 to form the preheated preform 208 and transferring the preheated preform 208 from the preheater furnace 202 to the consolidation furnace 206 for further processing to form consolidated preform 208.

Transfer of the preheated preform 208 from the preheater furnace 202 to the consolidation furnace 206 is accomplished with a transfer stage. The transfer stage is operatively connected to the preheater furnace 202 and the consolidation furnace 206. The transfer stage removes preheated preform 208 from the preheater furnace 202, carries and moves preheated preform 208 to the consolidation furnace 206, and inserts preheated preform 208 into consolidation furnace 206. The transfer stage is manual or automated. In one embodiment, the transfer stage includes an automated robot. Further description of the transfer process and transfer stages is given below.

The operating temperature of the preheater furnace 202 is set to a temperature at or above the threshold temperature needed for efficient reaction of drying agents and/or doping precursors. When the porous preform consists of silica or primarily of silica, the operating temperature of the preheater furnace 202 is 1000° C. or higher, or 1050° C. or higher, or 1100° C. or higher, or 1150° C. or higher, or in the range from 1000° C.-1200° C., or in the range from 1025° C.-1175° C., or in the range from 1050° C.-1150° C. To reduce system costs, it is preferable to limit the preheater furnace to a furnace having a maximum operating temperature of 1200° C. In the context of the present disclosure, preheating above 1200° C. is not preferred because it can lead to undesirable surface densification of the preheated preform. Furnaces capable of operating above 1200° C. are also more expensive.

In one embodiment, the preheater furnace 202 is operated to provide a preheated preform having a uniform temperature throughout its volume. As used herein, "uniform temperature" means that the temperature of the preheated preform deviates by less than ±5% from the average temperature of the preheated preform throughout its volume. A uniform temperature for the preheated preform can be achieved by controlling the residence time of the porous preform in the preheater furnace 202. A longer residence time leads to better uniformity of temperature at different positions within the preheated preform 208. As shown, for example, in FIGS. 4 and 5, the surface of the porous preform heats up more quickly than the interior of the porous preform. The difference in temperature between surface regions and interior region is greatest at low residence times and decreases as residence time increases. In this embodiment, when the preheated preform consists of silica or primarily of silica, the preheated preform has a uniform temperature greater than 1000° C. and less than 1200° C., or greater than 1050° C. and less than 1200° C., or greater than 1100° C. and less than 1200° C., or greater than 1150° C. and less than 1200° C., or in the range from 1000° C.-1200° C., or in the range from 1050° C.-1175° C.

Transfer of the preheated preform 208 from the preheater furnace 202 to the consolidation furnace 206 preferably occurs quickly to minimize cooling of the preheated preform. When the preheated preform 208 is removed from the preheater furnace 202, it passes through a cooler ambient and begins to cool as it is transferred to the consolidation furnace 206. As described below (see, for example, FIG. 8), appreciable cooling leads to complications when processing the preheated preform 208 in the consolidation furnace 206. Accordingly, to minimize cooling of the preheated preform 208 during transfer, the time of transfer (transfer time) of the preheated preform from the preheater furnace to the consolidation furnace is less than 20 min., or less than 15 min., or less than 10 min. or less than 5 min., or in the range from 1 min.-20 min., or in the range from 2 min.-15 min., or in the range from 3 min.-10 min. Use of an automated transfer stage, such as automated robot 204, facilitates rapid transfer of the preheated preform 208 from the preheater furnace 202 to the consolidation furnace 206.

Cooling during transfer occurs more quickly at the surface of the preheated preform than in the interior of the preheated preform. The temperature of the outer surface of the preheated preform 208 is higher at the time of removal from the preheater furnace 202 than at the time of insertion of the preheated preform 208 into the consolidation furnace. It is preferable to minimize the reduction in the temperature of the outer surface of the preheated preform 208 during transfer from the preheater furnace 202 to the consolidation furnace 206.

When the preheated preform 208 consists of silica or primarily of silica, the preheated preform 208 has an outer surface upon removal from the preheater furnace with a temperature greater than 1000° C. and less than 1200° C., or greater than 1050° C. and less than 1200° C., or greater than 1100° C. and less than 1200° C., or greater than 1150° C. and less than 1200° C., or in the range from 1000° C.-1200° C., or in the range from 1050° C.-1175° C. and the preheated preform 208 has an outer surface when inserted into consolidation furnace 206 greater than room temperature, or greater than 100° C., or greater than 400° C., or greater than 600° C., or greater than 800° C., or greater than 1000° C., or in the range from 400° C.-1100° C., or in the range from 500° C.-1050° C., or in the range from 600° C.-1000° C., or in the range from 650° C.-900° C. The decrease in the temperature of the outer surface of the preheated preform 208 during the transfer from the preheater furnace 202 to the consolidation furnace 206 is less than 600° C., or less than 500° C., or less than 400° C., or less than 300° C., or less than 200° C., or in the range from 100° C.-600° C., or in the range from 150° C.-550° C., or in the range from 200° C.-500° C.

Since, the preheating step is accomplished by the separate preheater furnace 202 in the process disclosed herein, preheating of the porous preform 208 no longer needs to be performed in the consolidation furnace 206 as occurs in the traditional processing of preforms. In the traditional processing of preforms, porous preform 208 is inserted into the consolidation furnace 206 at room temperature and preheating to temperatures required for efficient drying and doping occurs directly in the consolidation furnace 206. In the process described herein, in contrast, porous preform 208 is preheated independent of the consolidation furnace 206 to form preheated preform 208 which is then transferred the preheater furnace 202 and inserted into the consolidation furnace 206. Insertion of preheated preform 208 into consolidation furnace 206 improves process efficiency by reducing the processing time of the preform in the consolidation furnace 206. When using a preheated preform 208 as described herein, the processing time in the consolidation furnace 206 is limited to the time needed for drying, doping, and sintering of the preheated preform 208. In this way, the system 200 and methods 1100 and 1200 of the present disclosure results in a decreased deployment of the high capital cost consolidation furnace 206 for preheating, and a reduced overall cost of manufacturing equipment. Instead of dedicating process time of consolidation furnace 206 for preheating, utilization of consolidated furnace 206 is dedicated to the more demanding drying, doping, and/or sintering processes. As a result, overall process efficiency is improved. An exemplary system 200, an exemplary preheater furnace 202, and exemplary methods 1100 and 1200 in accordance with the present disclosure are discussed in detail below with respect to the FIGS. 2-14.

Figure 2:
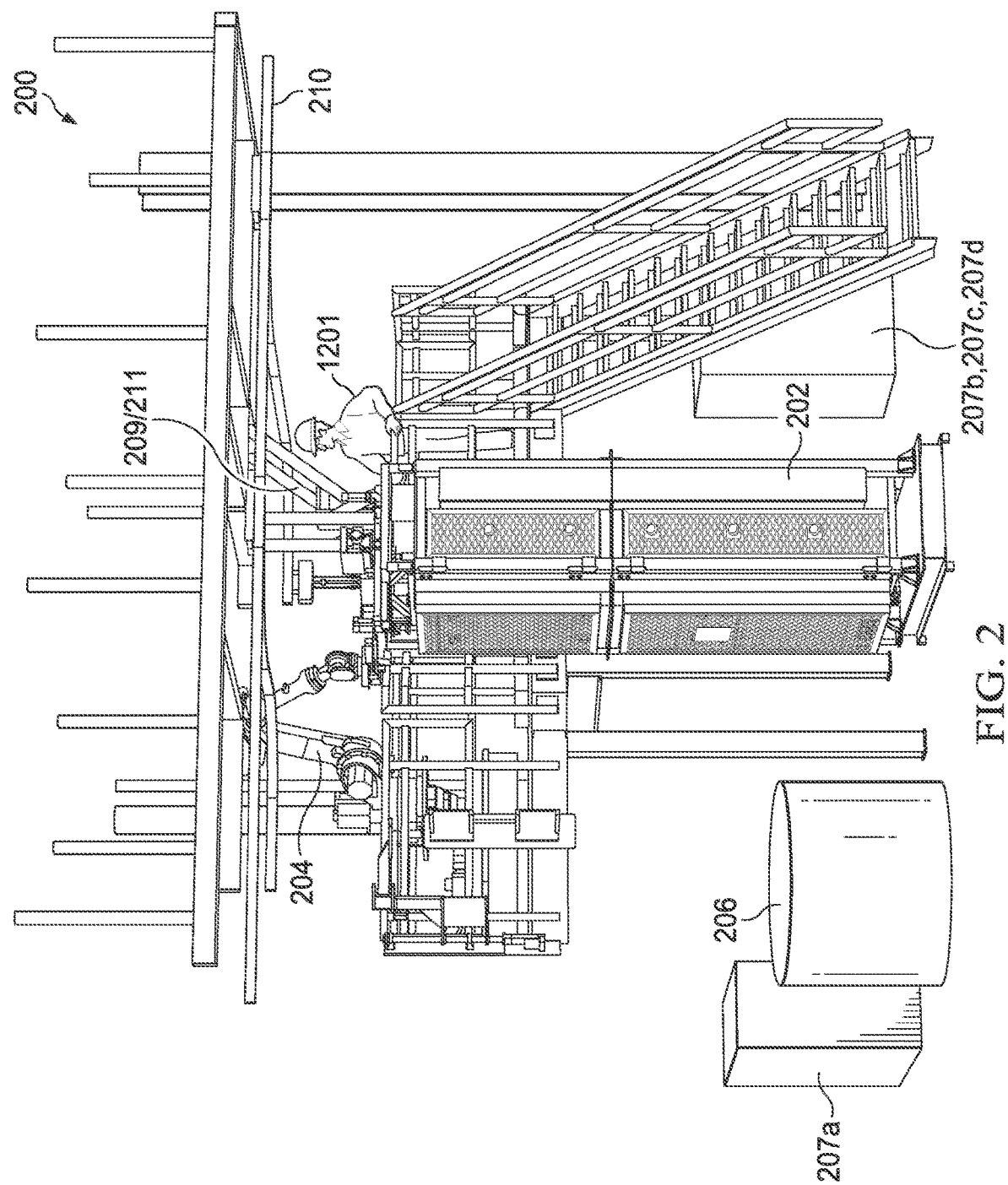
FIG. 2 is an illustration of an overall layout of a system (e.g., cell) that includes a preheater furnace, an automated robot, and a consolidation furnace in accordance with an embodiment of the present disclosure.

Referring to FIG. 2, there is shown an overall layout of a system 200 (e.g., a cell as an embodiment of system 200) that includes a preheater furnace 202, an automated robot 204 as an embodiment of a transfer stage, and a consolidation furnace 206 in accordance with an embodiment of the present disclosure. The preheater furnace 202 is shown on the righthand side of the consolidation furnace 206. In this example, the porous preform 208 is loaded into the preheater furnace 202 by the automated robot 204 which is mounted on and moves along a monorail 210 shown in the background (note: the porous preform 208 is shown located inside the preheater furnace 202 in FIG. 3C). The automated robot 204 is configured to (1) insert porous preform a 208 into preheater furnace 202, (2) to remove preheated preform 208 from preheater furnace 202, (3) transfer preheated preform from preheater furnace 202 to consolidation furnace 206, (4) insert preheated preform 208 into consolidation furnace 206, and/or (5) remove consolidated preform 208 from consolidation furnace 206. The automated robot 204 can also optionally (1) transfer the consolidated preform 208 from the consolidation furnace 206 to the unload station 209 (at a first pick point) and (2) transfer the porous preform 208 from a load station 211 (at a second pick point) to the preheater furnace 202 (see also FIG. 12) (note: the first and second pick points are located side-by-side). In addition, the system 200 includes multiple controllers 207a, 207b, 207c, and 207d each of which may comprise a memory, and a processor (including but not limited to a microprocessor, a microcontroller or a Digital Signal Processor (DSP), etc.). In this example, the controller 207a includes a processor and memory that stores machine-readable program code executable by the processor to control the operations of consolidation furnace 206. The controller 207b includes a processor and memory that stores machine-readable program code executable by the processor to control the operations of the preheater furnace 202. The controller 207c includes a processor and memory that stores machine-readable program code executable by the processor to control the operations of the automated robot 204. The controller 207d includes a processor and memory that stores machine-readable program code executable by the processor to control the operations of the automation cell which includes controlling the safety interlock features which occur when the operator 1201 enters the area to work (note: the controllers 207b, 207c, and 207d are shown with respect to one control cabinet for clarity but in practice each controller 207b, 207c, and 207d would typically have their own control cabinet) (see also the methods 1100 and 1200 described below with respect to FIGS. 11 and 12).

Figure 3A:
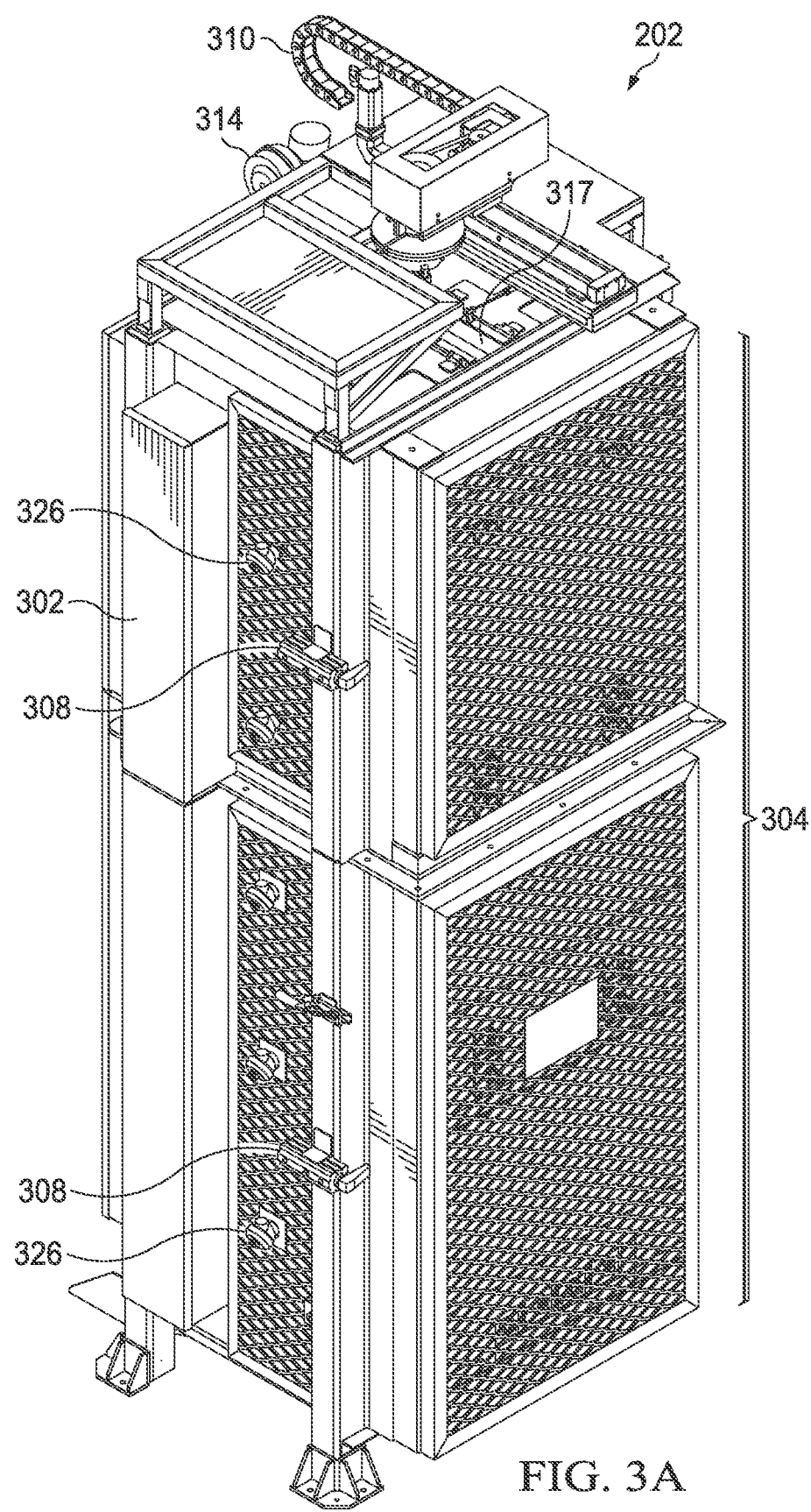
FIGS. 3A, 3B, and 3C each illustrate a different perspective view of the preheater furnace shown in FIG. 2 in accordance with an embodiment of the present disclosure.
Figure 3B:
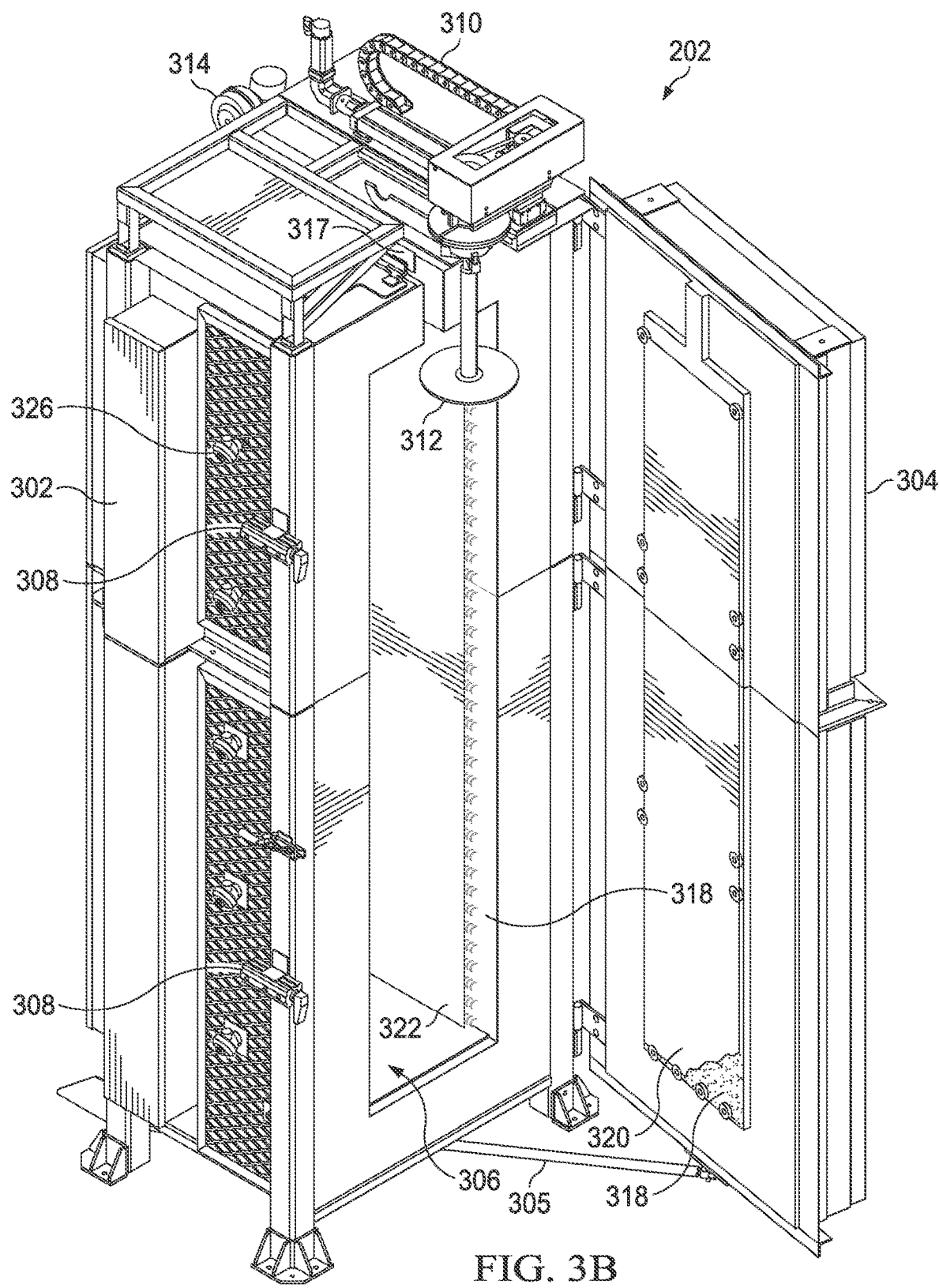
Figure 3C:
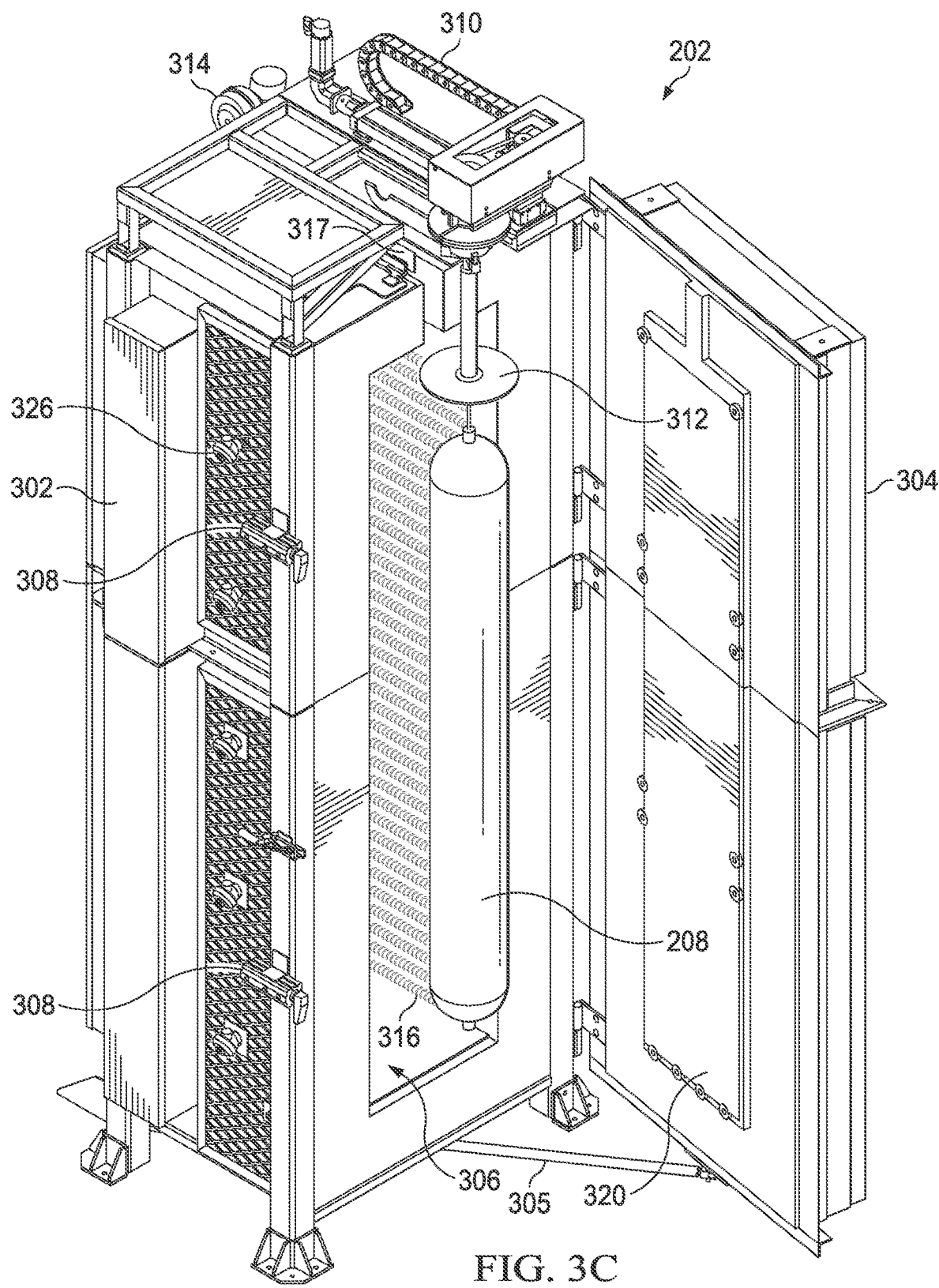

Referring to FIGS. 3A-3C, there are shown three different perspective views of an exemplary preheater furnace 202 configured in accordance with an embodiment of the present disclosure. The preheater furnace 202 includes a body 302 which has a door 304 attached thereto which when opened provides access to an interior space 306 of the body 302 and when closed prevents access to the interior space 306 of the body 302. The door 304 is operatively connected to an actuation system 305 which when actuated by the controller 207b can be opened to allow the insertion and removal of the porous preform 208 and preheated preform 208 with the aid of the automated robot 204 and when closed allows for the heating of the porous preform 208. Typically, the door 304 is closed while the porous preform 208 is being heated, or the preheater furnace 202 is in an idle mode (i.e., not being used). One or more automated door clamps 308 can be used to keep the door 304 securely closed when the preheater furnace 202 is not being loaded with the porous preform 208 or is being unloaded of the preheated preform 208.

Figure 10:
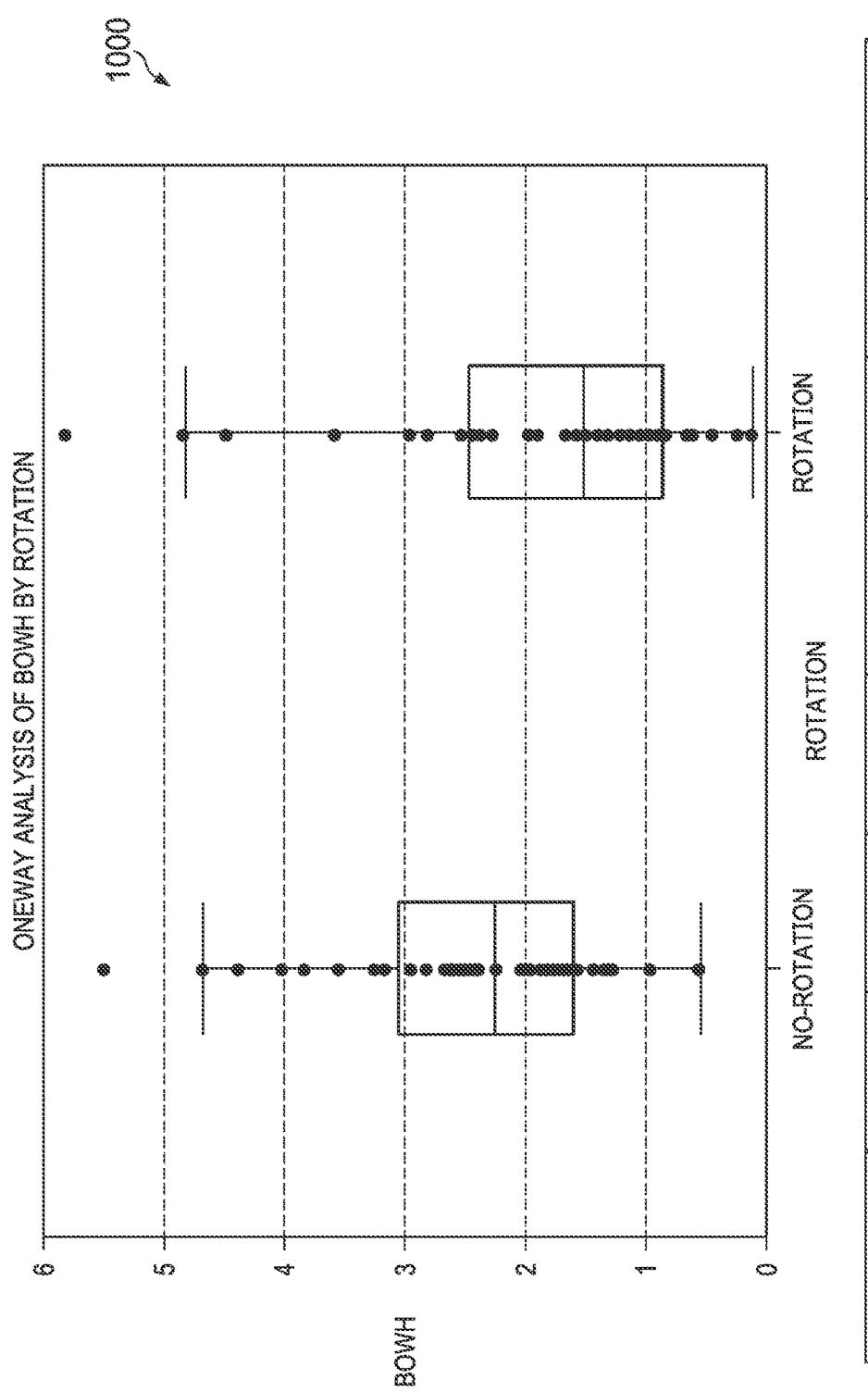
FIG. 10 illustrates a graph 1000 which shows the fiber bow (curl) resulting when the porous silica overclad preform experienced rotation during the heating step in the preheater furnace compared to the fiber bow (curl) when the porous silica overclad preform was not rotated during the heating step in the preheater furnace.

The preheater furnace 202 further includes a rotation-translation mechanism 310 which rotates the porous preform 208 or preheated preform 208 during heating to minimize or prevent azimuthal non-uniformity of temperature in the porous preform 208 during processing in the preheater furnace 202 (note: the azimuthal non-uniformity problem is discussed in detail below with respect to FIG. 10). Further, the rotation-translation mechanism 310 can be retracted to permit motion of the porous preform 208 or preheated preform 208 into or within the interior space 306 (see FIG. 3A) and extended to move the porous preform 208 or preheated preform 208 out from the interior space 306 (see FIGS. 3B-3C). The rotation-translation mechanism 310 while in the extended position enables the loading and unloading of the porous preform 208 or preheated preform 208 into and out of the preheater furnace 202. The rotation-translation mechanism 310 while in the extended position effectively reduces the amount of heat exposure to the robot tooling of the automated robot 204. The rotation-translation mechanism 310 further includes a spindle 312 which holds and rotates the porous preform 208 or preheated preform 208. The preheater furnace 202 can also include an air blower 314 to move hot air away from the rotation-translation mechanism 310. Further, the preheater furnace 202 can include another door 317 which is closed to prevent heat loss while the preheater furnace 202 is either heating the porous preform 208 or preheated preform 208, or is being unloaded and idle (see FIG. 3A). The door 317 would be open when the rotation-translation mechanism 310 is in the extended position during the loading and unloading of the porous preform 208 or preheated preform (see FIGS. 3B-3C).

The preheater furnace 202 includes one or more heating elements 316 (e.g., electrical heating elements 316) located therein which radiate heat to heat the porous preform 208 (see FIG. 3C). If desired, the preheater furnace 202 can have several individually controlled heating zones, each with its own temperature feedback and power control. In addition, the preheater furnace 202 includes furnace grade insulation 318 (e.g., high purity alumino-silicate refractory lines) which line the interior space 306 and insulate an exterior of the body 302 from the radiated heat (see FIG. 3B). The door 304 would also have insulation 318 located thereon (see FIG. 3B) and then have protective panels 320 (e.g., quartz panels 320) mounted over the insulation 318 (see FIG. 3C). If desired, an aluminum oxide coating can be applied to rigidize the hot face of the insulation 318 and prevent insulation particles from contaminating the preform 208. The preheater furnace 202 could also have a box muffle 322 which is composed of fused quartz or other ceramics and which would sit on a solid hearth composed of silicon carbide. The purpose of the box muffle 322 is to prevent the heating elements 316 and the insulation 318 from contaminating the outer surface of the porous preform 208 or preheated preform 208.

The preheater furnace 202 can also have ports 326 therein to allow for an inert gas (e.g., nitrogen) to flow and create a net gas flow to purge the interior space 306 so as to avoid exposing the preform 208 to furnace materials (e.g., heating elements 316 and insulation 318) which may contaminate the surface of the porous preform 208 or preheated preform 208 and alter in an unfavorable way the viscosity of the porous preform 208 or preheated preform 208.

Referring to FIGS. 4-8, there are shown various graphs which are referred to in the discussion below when describing features related to the heating of the porous preform 208 in the preheater furnace 202 and the transferring of the preheated preform 208 to the consolidation furnace 206 in accordance with an embodiment of the present disclosure. Prior to the heating stage and the consolidation stage, an outside vapor deposition (OVD) silica soot porous preform 208 can typically be formed with the laydown (deposition) of silica particles onto a core cane. The porous preform 208 is a porous material with a bulk density and surface density as described above. This porous preform 208 will subsequently be heated and consolidated into a consolidated preform 208 with a bulk density and surface density as described above. The traditional consolidation process for making single-mode fiber consists of heating, dehydration (drying), doping, and sintering the porous preform 208. Due to a fairly low thermal conductivity of the porous preform 208 which is about 0.3 to 0.4 W/m-K at 900° C., it takes a few hours to heat the porous preform 208 at an initial temperature of room temperature (25° C.) to a threshold temperature at which the chemical processes of drying and doping can occur efficiently. An exemplary threshold temperature for the drying and doping processes to be effective is about 1000° C. or higher for porous preforms consisting of silica or primarily of silica. After the porous preform 208 reaches this threshold temperature, then chemical processing (drying and doping) and sintering to final a density at higher temperatures can occur. In the traditional process, chemical treatment (drying and doping) and sintering can take several hours due to the need to preheat the porous preform 208 in the consolidation furnace 206 and to the typical size of porous preforms 208 used in the drawing of optical fibers (typically, 48 kg, 0.48 g/cm³ (bulk density), 2 meter length, and 240 mm diameter).

In the traditional consolidation process, the heating of the porous preform 208 to the threshold temperature in the consolidation furnace 206 occurs at the beginning of the process and does not require hazardous chemical delivery or pollution controls. Therefore, this heating step can be completed in a separate lower cost preheater furnace 202 rather than in the high capital cost consolidation furnace 206 in accordance with the present disclosure. When this is accomplished, the process time in the more expensive chemical and sintering consolidation furnace 206 can be reduced which is a marked improvement over the traditional consolidation process where the consolidation furnace 206 is utilized to heat the porous preform 208 to the threshold temperature.

Figure 4:
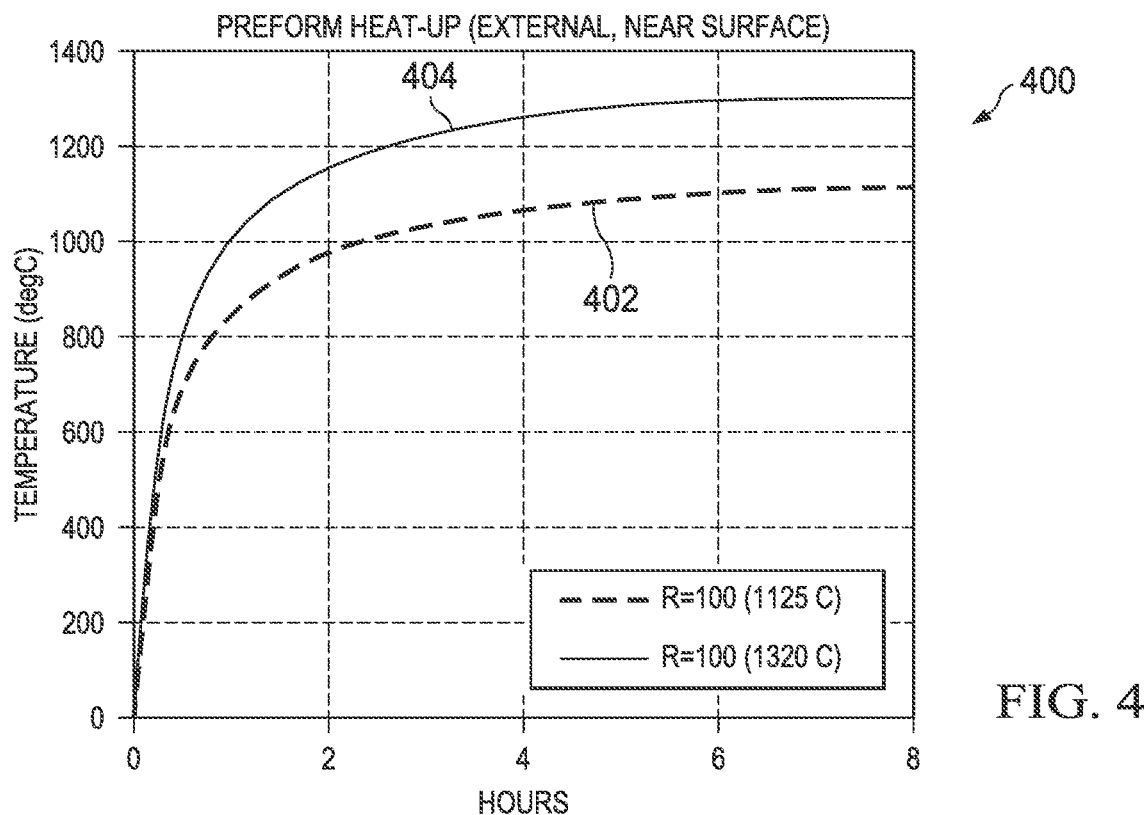
FIG. 4 illustrates a graph which indicates the heat-up (external, near surface) of an exemplary 48 kg porous silica overclad preform with a radius of 120 mm and a bulk density of 0.48 g/cm$^3$ at two different preheater furnace temperatures, namely 1125° C. and 1320° C.
Figure 5:
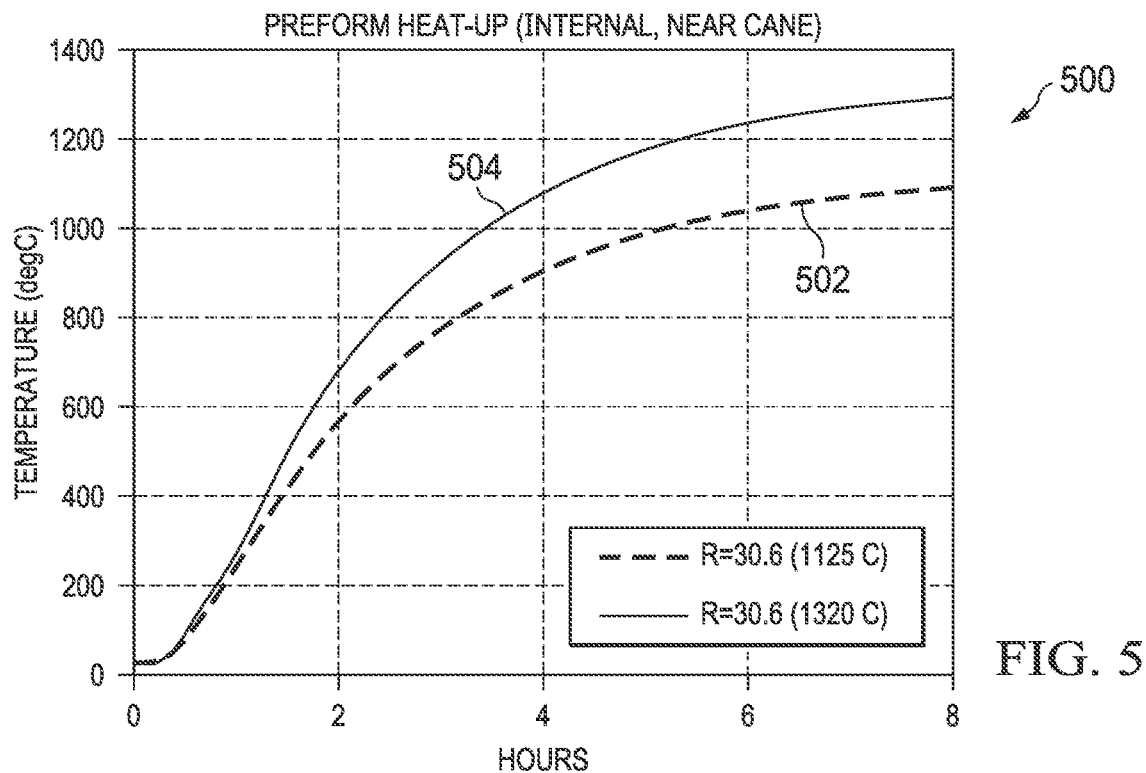
FIG. 5 illustrates a graph which indicates the heat-up (internal, near cane) of an exemplary 48 kg porous silica overclad preform with a radius of 120 mm and a bulk density of 0.48 g/cm$^3$ at two different preheater furnace temperatures, namely 1125° C. and 1320° C.

FIGS. 4 and 5 respectively illustrate graphs 400 and 500 which indicate details about the heat-up of an exemplary 48 kg overclad porous preform 208 with a radius of 120 mm and bulk density of 0.48 g/cm³ (hereinafter referred to as "exemplary porous preform") at two different furnace temperatures, namely 1125° C. and 1320° C. As shown, in graph 400 the portion of the exemplary porous preform near its surface reaches the effective threshold temperature of about 1000° C. in 1-2 hours depending on the temperature of the preheater furnace 202 (note: line 402 represents the temperature of the exemplary porous preform at a radial position of 100 mm and furnace temperature of 1125° C., and line 404 represents the temperature of the exemplary porous preform at radial position 100 mm and furnace temperature of 1300° C. However, as shown in graph 500 the center of the exemplary porous preform requires 3-5 hours to reach the same effective temperature (note: line 502 represents the temperature of the exemplary porous preform at radial position 30.6 mm and furnace temperature of 1125° C., and line 504 represents the temperature of the exemplary porous preform at radius 30.6 mm and furnace temperature of 1125° C.). Of course, the exemplary porous preform would heat more quickly if there were an increase in the temperature of the preheater furnace 202. However, if this were done, the surface of the preform 208 would begin to densify more rapidly during heating, which is an effect that could negatively impact the efficiency of the subsequent chemical processing in the consolidation furnace 206 as well as the effectiveness of the sintering and glass clarification (vitrification) which includes the removal of pores (seeds) from the preform. Therefore, an optimization should be practiced in which the porous preform 208 is heated efficiently within the preheater furnace 202 without causing significant densification of the surface of the porous preform 208.

Figure 6:
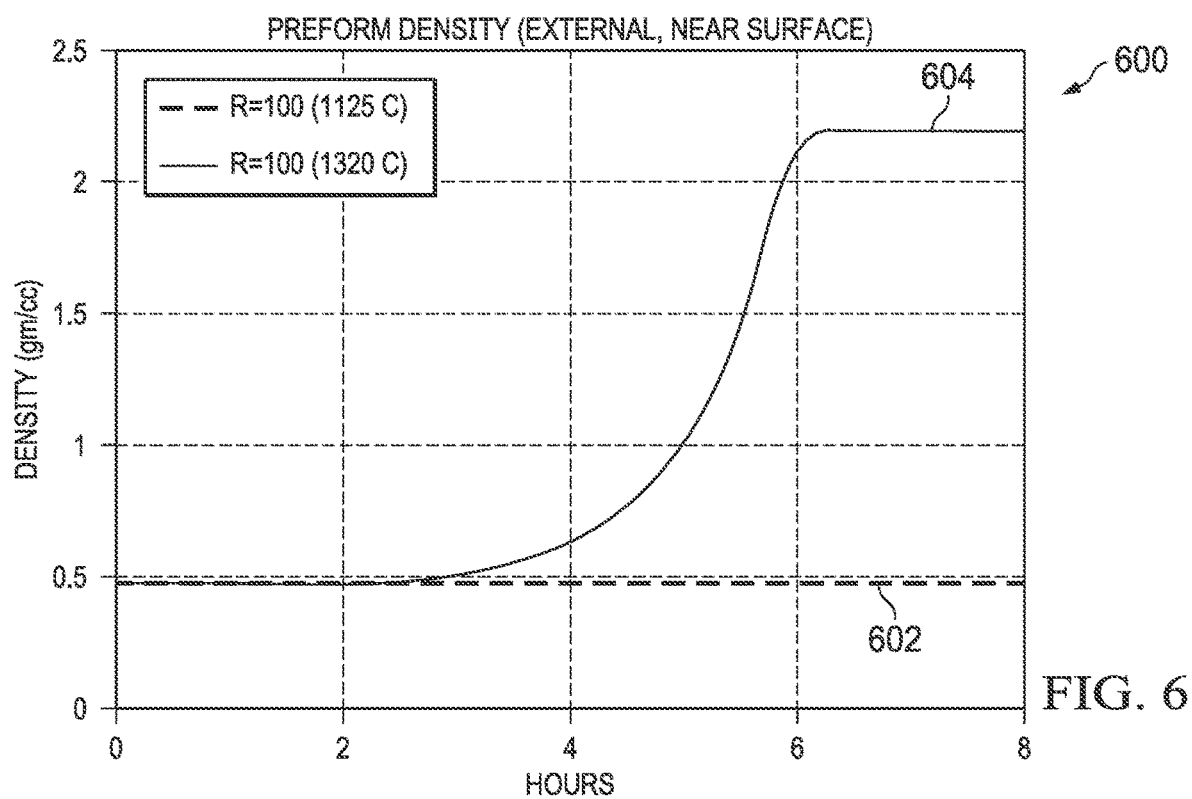
FIG. 6 illustrates a graph which shows the densification history in the outer regions of the exemplary 48 kg porous silica overclad preform at two different furnace temperatures, namely 1125° C. and 1320° C.

FIG. 6 illustrates a graph 600 which shows the densification history in the outer regions of the exemplary porous preform at two different furnace temperatures, namely 1125° C. and 1320° C. As shown, in graph 600 the density near the surface of the exemplary porous preform increases very slightly over time for a furnace temperature at 1125° C., but increases to a fully densified state after only about 6 hours for a furnace temperature of 1320° C. (note: line 602 represents the density of the exemplary porous preform at radial position 100 mm for a furnace temperature of 1125° C., and line 604 represents the density of the exemplary porous preform at radial position 100 mm for a furnace temperature of 1320° C.). Therefore, as discussed above while the porous preform 208 can be heated more quickly at higher temperatures, care should be taken so as to not cause significant densification of the outer regions of the porous preform 208 in the preheater furnace 202 prior to transfer to the consolidation furnace 206 for chemical treatment and sintering.

An important feature of the present disclosure is to heat the porous preform 208 in a low cost separate preheater furnace 202 at about 1125° C. for about five hours or slightly longer until the porous preform 208 reaches the threshold temperature of around 1000° C. or higher, and then to quickly transfer the resulting preheated preform 208 to the more expensive consolidation furnace 206 for chemical treatment (drying and/or doping) and sintering at higher temperatures. The cost and complexity of operating the consolidation furnace 206 below 1200° C. per the new process is significantly less than when the consolidation furnace 206 had to operate above 1200° C. in order to heat the porous preform 208 to the threshold temperature of around 1000° C. or higher. Further, since the processing time for chemical treatment and sintering is several hours, the operation of the separate preheater furnace 202 can be matched with the consolidation furnace 206. In this regard, the combined processing time in both the preheater furnace 202 and the consolidation furnace 206 in the context of the present disclosure is, for example, 5-8 hours which results in a higher output or process rate than for manufacturing that involves only the consolidation furnace 206 (e.g., see discussion below with respect to FIG. 12 where a porous preform 208 can be heated in the preheater furnace 202 while a previously heated porous preform 208 is being processed simultaneously in the consolidation furnace 206).

In order to improve the efficiency and repeatability of the process using the preheater furnace 202, of warehandling automation, such as the automated robot 204, can also be used so that the transfer time of the preheated preform 208 from the preheater furnace 202 to the consolidation furnace 206 is minimized and repeatable. The repeatable transfer of the preheated preform 208 from the preheater furnace 202 to the consolidation furnace 206 is important because the temperature profile of the preheated preform 208 entering the consolidation furnace 206 is an important factor in determining the required process conditions for the drying and/or doping processes.

Figure 7:
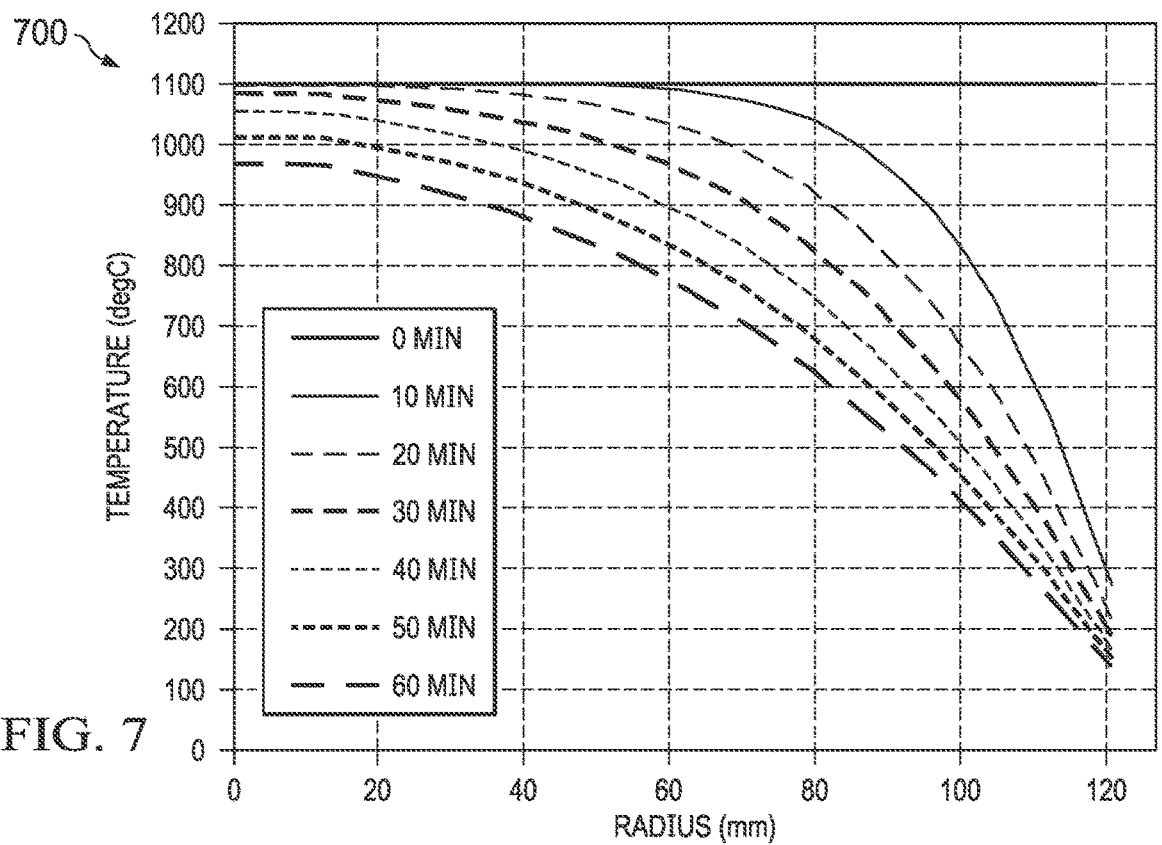
FIG. 7 illustrates a graph which shows the temperature profile of the exemplary 48 kg porous silica overclad preform after being removed from the preheater furnace operating at 1100° C. in which the porous silica overclad preform had a radially isothermal temperature of 1100° C.

FIG. 7 illustrates a graph 700 which shows the temperature profile of an exemplary preheated preform after the removal from the preheater furnace 202. The exemplary preheated preform was formed from the exemplary porous preform described above by heating in the preheater furnace at 1100° C. for a time sufficient to achieve a radially isothermal temperature of 1100° C. Graph 700 shows the evolution of the temperature profile (temperature as a function of radial position) in the exemplary preheated preform as a function of time in room temperature air after removal from the preheater furnace 202. As shown in graph 700, outer portion of preheated preform 208 has cooled significantly after just 10 minutes following removal from the preheater furnace 202. The temperature of the internal portion of the exemplary preheated preform, in contrast, is nearly unchanged. A significant cooldown in the radial temperature profile of the preform 208 during the transfer to the consolidation furnace 206 is preferably avoided as it could adversely impact the consolidation process as discussed next with respect to FIG. 8.

Figure 8:
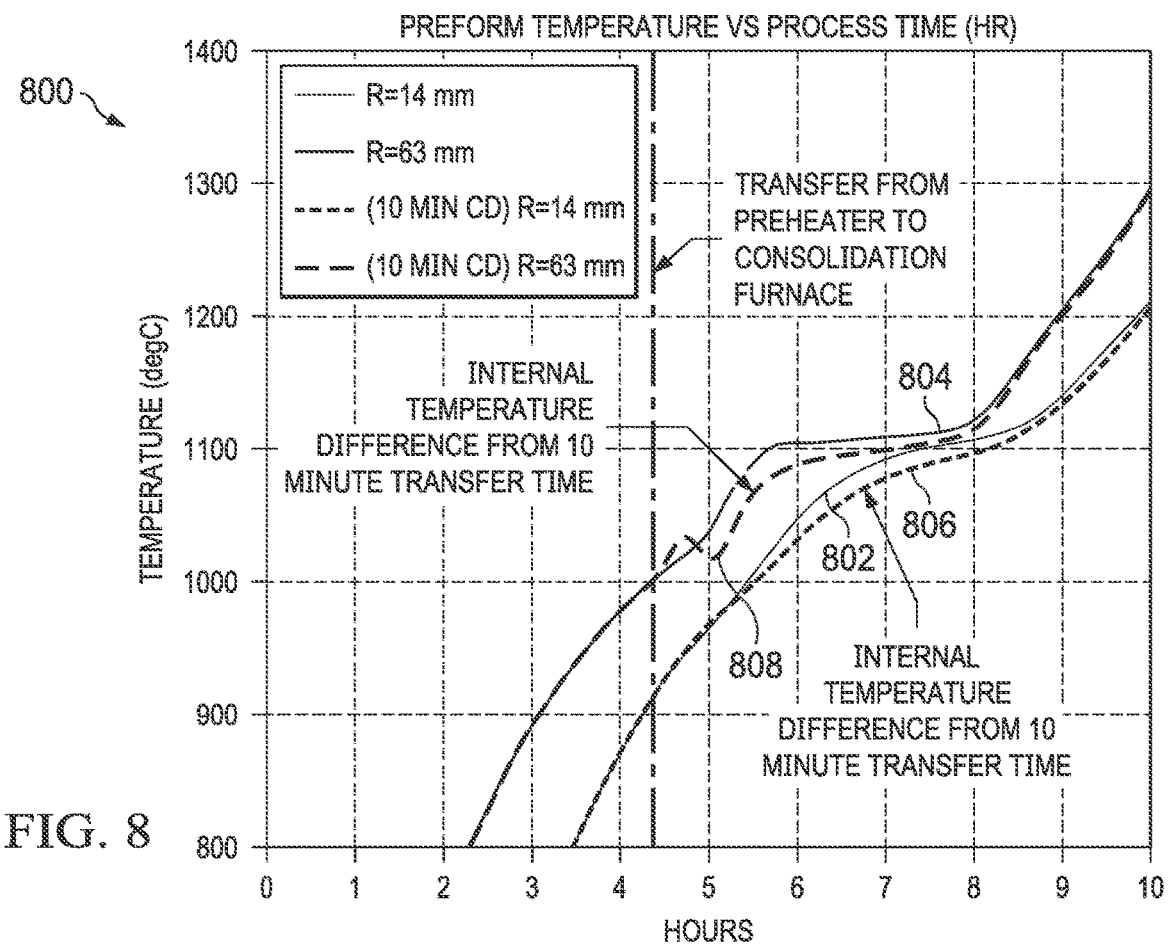
FIG. 8 illustrates a graph which shows the internal temperature of the exemplary 48 kg porous silica overclad preform after a few hours in the preheater furnace and after the exemplary 48 kg preform had a 10 minute transfer time from the preheater furnace to the consolidation furnace.

FIG. 8 illustrates a graph 800 which shows the internal temperature of the exemplary preheated preform at two radial positions (14 mm and 63 mm) as a function of time over a range of time that includes transfer of the exemplary preheated preform from the preheater furnace 202 to the consolidation furnace 206. The time of transfer is noted as a vertical dashed line and occurred at a time of approximately 4.25 hr. The effect of the transfer time from the preheater furnace 202 to the consolidation furnace 206 on the temperature profile was considered at the two radial positions. In FIG. 8, the preheater furnace 202 was operated at 1125° C. and the consolidation furnace 206 was operated at 1320° C. Line 802 represents the temperature of the exemplary preheated preform at radial position 14 mm assuming an idealized transfer time of zero (immediate transfer). Line 804 represents the temperature of the exemplary preheated preform at radial position 63 mm assuming an idealized transfer time of zero (immediate transfer). Line 806 represents the temperature of the exemplary preheated preform at radial position 14 mm assuming a transfer time of 10 minutes. Line 808 represents the temperature of the exemplary preform at radial position 63 mm assuming a transfer time of 10 minutes. As shown in graph 800, when the exemplary preheated preform experiences a cooldown due to a 10-minute transfer time, the temperature of the outer portion deviates by about 10° C. from the idealized temperature profile upon placement in the consolidation furnace 206, while essentially no deviation in temperature is observed for the inner portion. (For the outer portion, compare lines 804 and 808 at times following introduction of the exemplary preheated preform and for the inner portion, similarly compare lines 802 and 806. The differences in the temperature profile of the inner and outer portions of the exemplary preheated preform resulting from cooldown during transfer contribute to differences in chemical drying and doping that variability to the manufacturing process and non-uniformities in the composition of the consolidated preform.

Mitigation of cooldown effects is achieved through automation of the transfer process by the transfer stage of the preheated preform 208 from the preheater furnace 202 to the consolidation furnace 206. Automation leads to greater consistency in transfer time (thus reducing variability in manufacturing) and shorter transfer times (thus minimizing the effects of cooldown). The temperature profile of the preheated preform 208 at the time of insertion in the consolidation furnace 206 is also more predictable and the heating protocol used in consolidation furnace 206 can be adjusted accordingly to improve uniformity in drying, doping and sintering. With a repeatable transfer time, the process time in the consolidation furnace 206 can be minimized because the preheating portion of the process occurs within the preheater furnace 202 and the process conditions are simplified because movement and transfer time of the preheated preform 208 is predictable and repeatable thus the temperature profile of the preform 208 is also predictable and repeatable. In one embodiment, the automated robot 204 enables a transfer time that is consistent and less than five minutes.

In addition to the temperature profile of the preheated preform 208, the density of the preheated preform 208 is also important because it relates to the porosity of the preheated preform 208 and accessibility of drying agents and doping precursors positions on the surface and in the interior of the preheated preform 208. As densification occurs, porosity decreases and diffusion of drying agents and doping precursors is inhibited. Variations in density over the volume of the preheated preform 208 lead to non-uniformities in moisture and dopants in the consolidated preform 208. It is accordingly preferably to minimize densification of porous preform 208 in the preheater furnace 202 to maintain low bulk and surface density in preheated preform 208.

Figure 9:
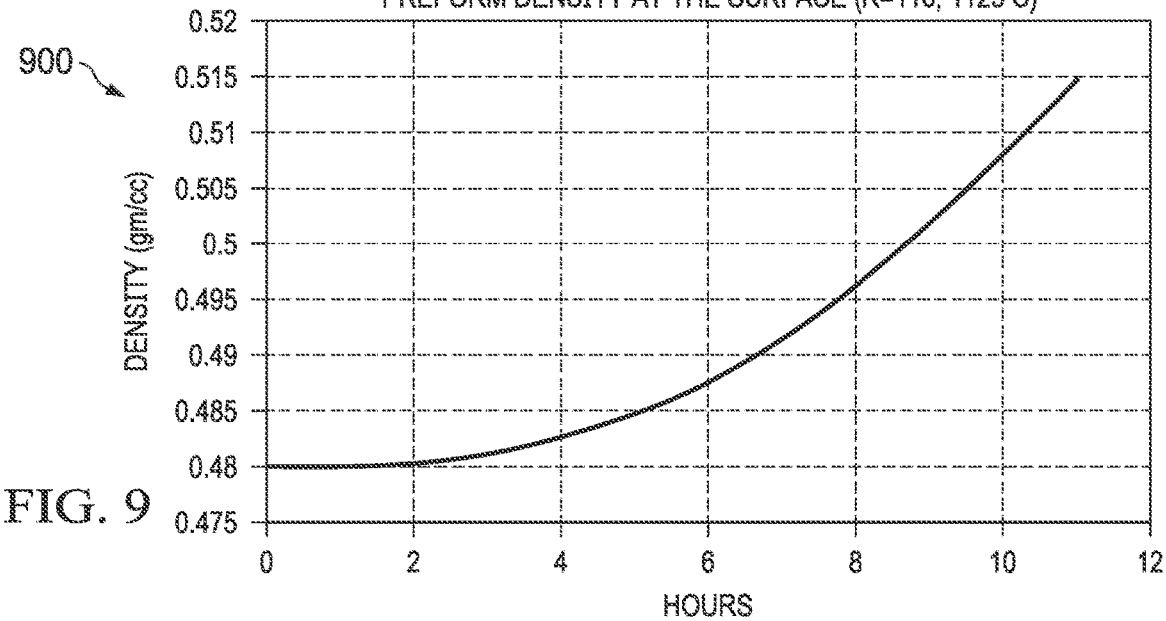
FIG. 9 illustrates a graph which shows the density vs. time for the exemplary 48 kg porous silica overclad preform that was at room temperature (25° C.) when loaded into the preheater furnace, which was operating at 1125° C.

FIG. 9 illustrates a graph 900 which shows the density vs. time for the exemplary preform described above as a function of time in a preheater furnace 202 operated at 1125° C. The exemplary preform was loaded into the preheater furnace 202 at room temperature (25° C.). As shown, the density at a radial position of 116 mm (close to radial position of 120 mm at the surface) begins to increase after just two hours in the preheater furnace 202. This change in density should be taken into account when establishing the temperature of the preheater furnace 202 and the process time within the preheater furnace 202.

Further, if the temperature distribution in the preheater furnace 202 is not uniform, then portions of the porous preform 208 in either or both of the axial and azimuthal directions will not heat at the same rate. This could result in a preheated preform 208 with non-uniformities in temperature and/or density, which in turn may result in a consolidated preform 208 with non-uniformities in moisture or dopant concentration following treatment in the consolidation furnace 206. A lack of chemical uniformity in the azimuthal direction of the consolidated preform 208 can result in internal stresses is optical fibers drawn from consolidated preform 208, which in turn can result in an undesirable increase in the bow or curl of the optical fiber.

One approach to minimize azimuthal non-uniformity is to rotate the porous preform 208 in the preheater furnace 202. For instance, the preheated preform 208 can be rotated at a rate of 30 revolutions per hour, or at a rate of 60 revolutions per hour, or at a rate of 90 revolutions per hour, or at a rate in the range from 30 revolutions per hour—150 revolutions per hour, or at a rate of 50 revolutions per hour—120 revolutions per hour, or at a rate of 60 revolutions per hour—90 revolutions per hour. FIG. 10 illustrates a graph 1000 that shows the fiber bow (curl) that results in an optical fiber drawn from a consolidated preform 208 formed from a porous preform 208 that was rotated in preheater furnace 202 relative to a fiber drawn from a consolidated preform 208 formed from a porous preform 208 that was not rotated in preheater furnace 202. (Note: In FIG. 10, BOWH is an acronym known in the art for bow (curl) measured from an approximately 1-meter long piece of fiber taken from the end of the reel of fiber). Rotation of the porous preform 208 in the preheater furnace 202 minimizes the effect of thermal non-uniformities in the preheater furnace 202 itself and results in a preheated preform 208 having a more uniform density profile in the azimuthal direction relative to the density profile in the azimuthal direction of porous preform 208 that was not rotated in the preheater furnace 202.

Figure 11:
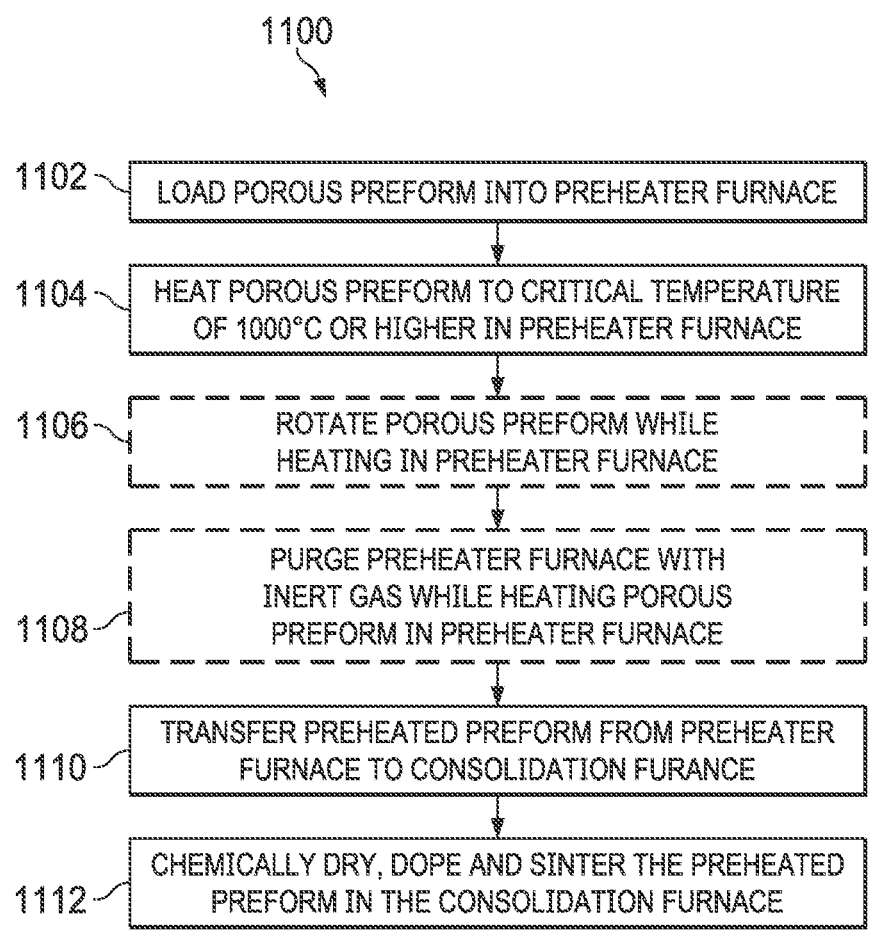
FIG. 11 is a flowchart illustrating the steps of an exemplary method in accordance with an embodiment of the present disclosure.

Referring to FIG. 11, there is shown a flowchart illustrating the steps of an exemplary method 1100 in accordance with an embodiment of the present disclosure. At step 1102, the porous preform 208 is loaded into the preheater furnace 202. In one example, the automated robot 204 loads the porous preform 208 into the preheater furnace 202. At step 1104, the preheater furnace 202 heats the porous preform 208 per a predetermined heat-profile until the porous preform 208 is uniformly heated to a temperature above 1000° C. In one example, the preheater furnace 202 heats the porous preform 208 per the predetermined heat-profile at a predetermined temperature (e.g., approximately 1125° C.) over a predetermined time (e.g., approximately 5 hours) until the porous preform 208 is uniformly heated to the temperature above 1000° C. If desired, the porous preform 208 can be rotated at step 1106 (optional) while being heated within the preheater furnace 202 to address the aforementioned azimuthal non-uniformity problem. Also, the preheater furnace 202 can be purged at step 1108 (optional) with an inert gas (e.g., nitrogen) when the porous preform 208 is heated in the preheater furnace 202 to avoid exposing the porous preform 208 to furnace materials which may contaminate the surface of the porous preform 208 and alter the viscosity of the porous preform 208 in an unfavorable manner. At step 1110, the preheated preform 208 is transferred from the preheater furnace 202 to the consolidation furnace 206 after the porous preform 208 has been uniformly heated to the threshold temperature above 1000° C. within the preheater furnace 202. In one example, the automated robot 204 can be used as a transfer stage to transfer the preheated preform 208 from the preheater furnace 202 to the consolidation furnace 206. At step 1112, the consolidation furnace 206 operates to chemically dry, dope, and sinter the preheated preform 208 to form the consolidated preform 208, which can in a subsequent process be drawn into optical fiber.

Figure 12:
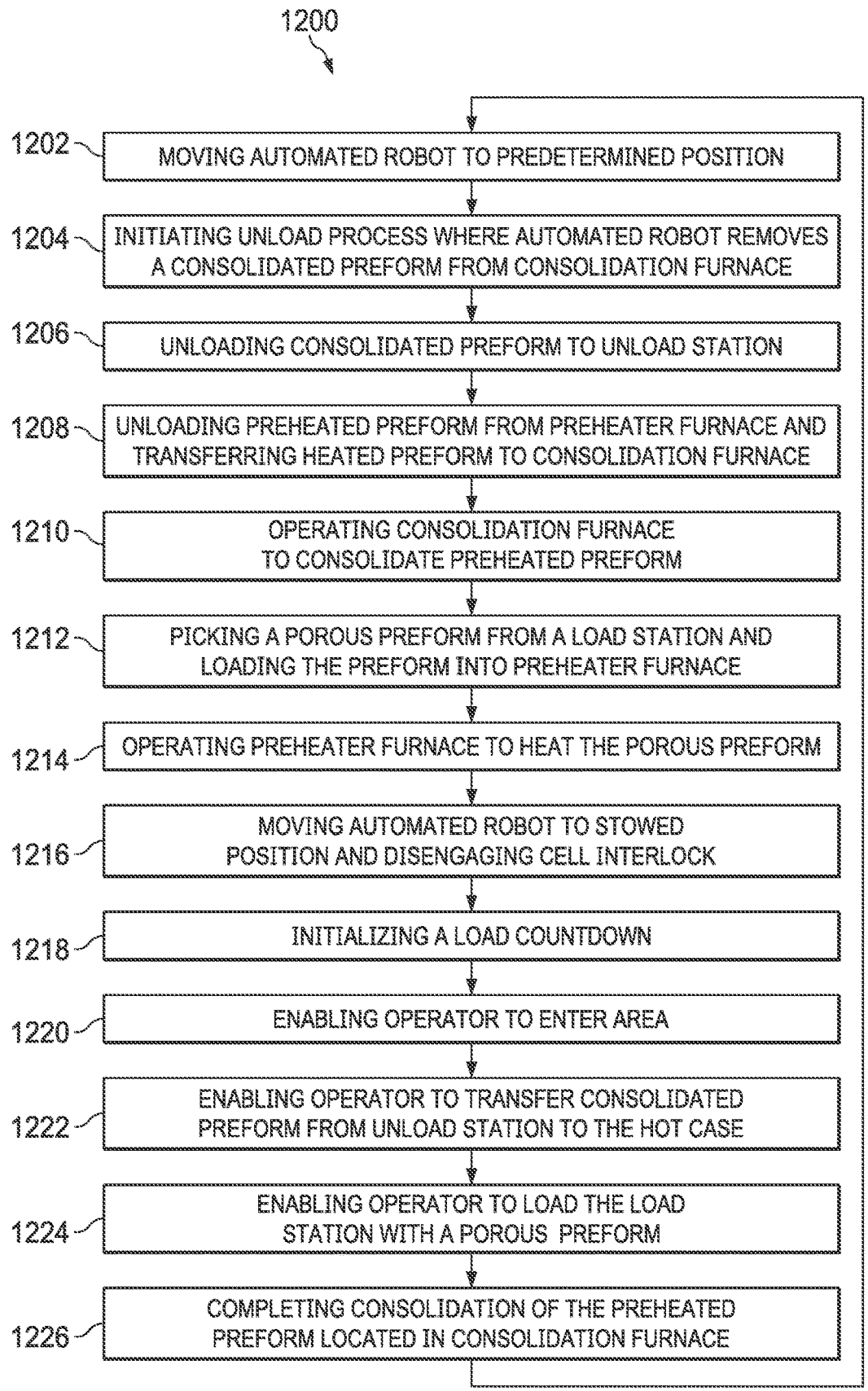
FIG. 12 is a flowchart illustrating the steps of another exemplary method in accordance with another embodiment of the present disclosure.

Referring to FIG. 12, there is shown a flowchart illustrating the steps of an exemplary method 1200 in accordance with another embodiment of the present disclosure. The flowchart illustrates the continuous manufacturing wareflow steps in the system 200 (e.g., cell 200) that includes the preheater furnace 202, the consolidation furnace 206, and the automated robot 204, which is mounted on and moves along the monorail 210 to reduce operator interaction and provide consistency in the transfer of the preheated preform 208 between the preheater furnace 202 and the consolidation furnace 206 (see FIG. 2). In this example, the operator 1201 only loads the load station 211 with the porous preform 208 for the automated robot 204 and unloads the consolidated preform 208 from the unload station 209 that was placed there by the automated robot 204 after the porous preform 208 has completed the processing steps in the preheater furnace 202 and the consolidation furnace 206 (see steps 1220, 1222, 1224, and 1226). The intermediate steps involving the movement of the porous preform 208, the preheated preform 208, and the consolidated preform 208 as well as the starting and ending of both of the heating steps and the consolidating steps are controlled by a remote processor and the automated robot 204 (see steps 1202, 1204, 1206, 1208, 1210, 1212, 1214, 1216, and 1218). A detailed discussed of the method 1200 is provided next.

At step 1202, the system 200 (e.g., cell 200) interlock is engaged which includes locking to prevent entry of the operator 1201 during automated tasks, and the automated robot 204 moves into a predetermined operating position. At step 1204, the system 200 (e.g., cell 200) initiates the unload process for the automated robot 204 in which the automated robot 204 removes a consolidated preform 208 from the consolidation furnace 206. At step 1206, the automated robot 204 unloads the consolidated preform 208 to the unload station 209 (see FIG. 2). At step 1208, the automated robot 204 unloads the preheated preform 208 from the preheater furnace 202 and transfers the preheated preform 208 to the consolidation furnace 206. At step 1210, the system 200 (e.g., cell 200) begins the consolidation process in which the consolidated furnace 206 is operated to chemically dry, dope, and sinter the preheated preform 208 into a clear glass state (consolidated preform 208) that can be subsequently drawn by another process (not shown) into optical fiber. At step 1212, automated robot 204 picks up the porous preform 208 from the load station 211 and loads the porous preform 208 into the preheater furnace 202. At step 1214, the system 200 (e.g., cell 200) begins the heating process in which the preheater furnace 202 is operated to heat the porous preform 208 per a predetermined heat-profile until the porous preform 208 is uniformly heated to a temperature above 1000° C. (note: the preheater furnace 202 can be configured to rotate the porous preform 208 therein during the heating process and that the preheater furnace 202 is optionally purged with an inert gas during the heating process). At step 1216, the automated robot 204 (while unloaded) is moved to a stowed position S and the cell interlock is disengaged, which includes allowing entry upon request by the operator 1201. At step 1218, the system 200 (e.g., cell 200) initiates a load station 211 countdown which is done to ensure that a porous preform 208 is loaded into load station 211 within a time window that will allow that porous preform 208 to be uniformly preheated once it is loaded into the preheater furnace 202 by the automated robot 204. At step 1220, the operator 1201 enters the area associated with the system 200 (e.g., cell 200). At step 1222, the operator 1201 transfers the consolidated preform 208 from the unload station 209 to a hot case (not shown). At step 1224, the operator 1201 loads the unload station 211 with a porous preform 208. At step 1226, the operator 1201 exits the area associated with the system 200 (e.g., cell 200) and no further action is taken until after completing the consolidation process in the consolidation furnace 206. After the completion of the consolidation process in the consolidation furnace 206, the method 1200 is started again at step 1202 and this process continues repeatedly. It should be appreciated that the system 200 comprises the controller 207 (typically located remote from the process area) which may comprise a memory, and a processor (including but not limited to a microprocessor, a microcontroller or a Digital Signal Processor (DSP), etc.). The memory stores machine-readable program code executable by the processor to cause the system 200 to perform the steps of the above-described methods 1100 and 1200.

In view of at least the foregoing, it can be appreciated that there is described and enabled the new system 200 and new methods 1100 and 1200 for heating a porous preform 208 in a preheater furnace 202 and then transferring the preheated preform to a consolidation furnace 206 for chemical treatment and sintering into a consolidated preform 208 that can be drawn into optical fiber. The new system 200 and new methods 1100 and 1200 have several advantages over the traditional consolidation process which does not involve the use of the preheater furnace 202 but only involves the use of the consolidation furnace 206. These advantages are described next.

Figure 13:
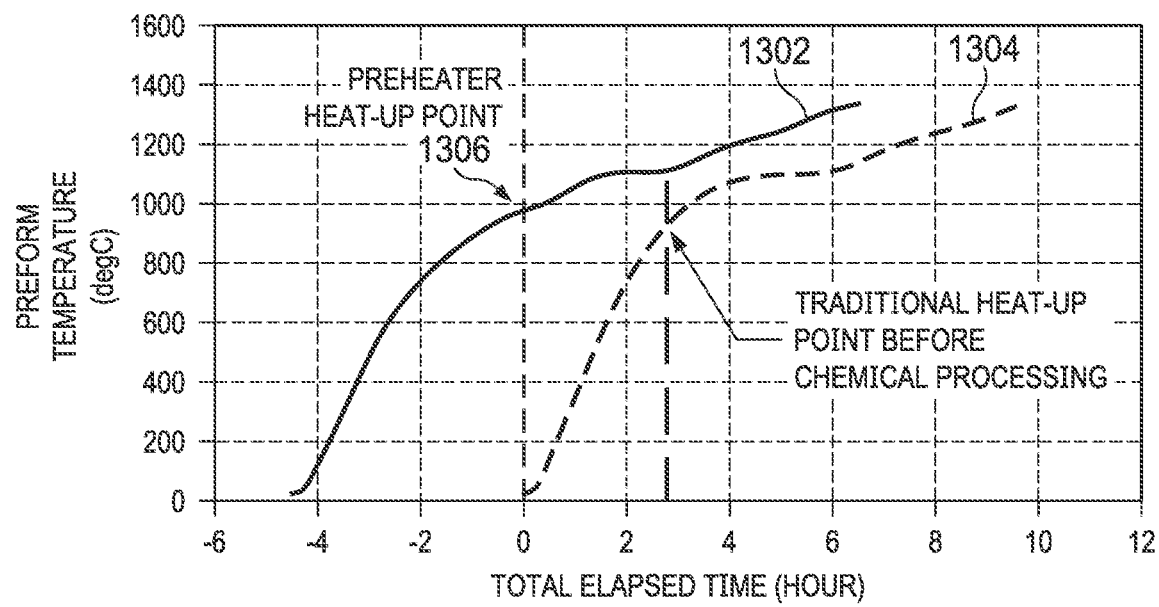
FIG. 13 illustrates a graph which shows a radial temperature profile of a porous silica overclad preform.
Figure 14:
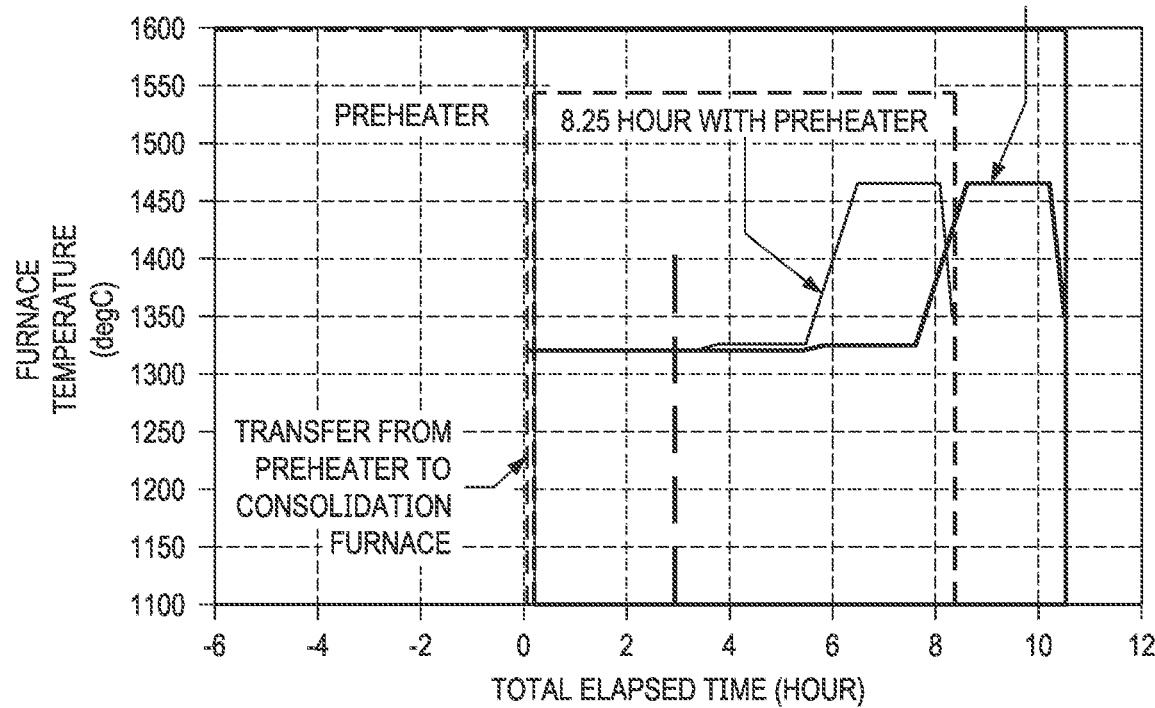
FIG. 14 illustrates a graph which shows a furnace temperature history for a hypothetical traditional consolidation process and a preheater-enhanced consolidation process in accordance with an embodiment of the present disclosure.

Referring to FIGS. 13 and 14, there are respectively shown a graph 1300 illustrating a preform radial internal temperature profile and another graph 1400 illustrating the furnace temperature history for a hypothetical traditional consolidation process and the preheater-enhanced consolidation process in accordance with the present disclosure. The graph 1300 shows a comparison of the internal temperature of the exemplary porous preform vs. time after the exemplary porous preform is loaded in a preheater furnace 202 per the process of the present disclosure (see line 1302) relative to direct loading of the exemplary porous preform in a consolidation furnace 206 per the prior art (see line 1304). For line 1302, the initial temperature of the preheater furnace 202 was 25° C. For line 1304, the initial temperature of the consolidation furnace 206 was 25° C. The line 1304 depicts the prior art process in which the exemplary porous preform is only heated inside the traditional consolidation furnace 206 without use of a preheater furnace 202. The line 1302 depicts the process in the present disclosure in which the exemplary porous preform is heated first in the separate preheater furnace 202 and then transferred to the consolidation furnace 206 after the preform 208 has reached an acceptable (threshold) temperature (heat-up point 1306) as shown on graph 1300. The time difference between the two lines 1302 and 1304 at the heat-up point 1306 represents the reduction in the residence time of the exemplary preform (in a preheated state) in the consolidation furnace 206 because of the use of the separate preheater furnace 202 for heating the exemplary porous preform. Since the preheater furnace 202 is in addition to the consolidation furnace 206, the output from the system 200 (e.g., cell) utilizing the combined preheater furnace 202 and the consolidation furnace 206 is increased. Recall that in many cases, the effective and final chemical treatment requires that all portions of the preform be at a high enough temperature (e.g., higher than 1000° C.). Since the porous preform 208 is heated from the outside, the inner portions of the porous preform 208 (the portions closest to the centerline) reach the required temperature later than the outer portions of the porous preform 208 (portions closest to the surface) in the heat-up process.

The graph 1400 in FIG. 14 shows the temperature history of the traditional process (consolidation furnace alone) and the present process (combined preheater furnace 202 and consolidation furnace 206). As can be seen from graph 1400, the use of a preheater furnace 202 can reduce the time required for the traditional consolidation step by 21% (8.25 hr instead of 10.5 hr). This is possible since the chemical treatment in the consolidation furnace 206 can occur much earlier due to the independent heating of the porous preform 208 in the preheater furnace 202. The time required in the consolidation furnace 206 to complete chemical processing is thus reduced thus resulting in a time savings in the utilization of the consolidation furnace 206. The amount of time saved is a function of the required internal temperature of the porous preform 208, and the amount of time and type of chemical treatment required in the consolidation furnace 206. In other examples, with shorter or different required chemical treatments, the overall reduction in the consolidation furnace process time is as much as 35% when compared to prior art processes that utilize only a consolidation furnace 206 to both preheat and consolidate the porous preform 208.

The following are selected additional advantages associated with a process that combines the use of a preheater furnace and a consolidation furnace relative to prior art processes that utilize only a consolidation furnace:

Reduced time in the consolidation furnace:

a. $Cl_2$ dry time can be reduced by about 50%.

b. Capacity increase (number of preforms processed per unit time) of about 25% when using a dedicated preheater furnace.

Improvement in capital efficiency for new consolidation furnace installations. Inexpensive preheater furnaces paired with consolidation furnaces, result in less capital cost for an equivalent amount of consolidation output/capacity.

Adding the automation robot 204 reduces blank handling losses, improves process repeatability, and improves labor efficiency.

Clause 1 of the description discloses:
A system comprising:
a preheater furnace configured to receive a porous preform and to heat the porous preform to form a preheated preform, the preheated preform having an outer surface; and
a transfer stage configured to transfer the preheated preform from the preheater furnace to a consolidation furnace configured to sinter the preheated preform to form a consolidated preform, the transfer including removing the preheated preform with the outer surface at a first temperature from the preheater furnace and inserting the preheated preform with the outer surface at a second temperature into the consolidation furnace, the first temperature exceeding 1000° C. and the second temperature being greater than room temperature and less than the first temperature.

Clause 2 of the description discloses:
The system of clause 1, wherein the preheater furnace is further configured to rotate the porous preform.

Clause 3 of the description discloses:
The system of clause 1 or 2, wherein the porous preform has a mass greater than 25 kg.

Clause 4 of the description discloses:
The system of any of clauses 1-3, wherein the porous preform has a bulk density in the range from 0.35 $g/cm^3$-0.70 $g/cm^3$.

Clause 5 of the description discloses:
The system of any of clauses 1-3, wherein the preheated preform has a surface density in the range from 0.35 $g/cm^3$-0.70 $g/cm^3$.

Clause 6 of the description discloses:
The system of any of clauses 1-5, wherein the consolidation furnace is further configured to dry or dope the preheated preform.

Clause 7 of the description discloses:
The system of any of clauses 1-6, wherein the first temperature is less than 1200° C.

Clause 8 of the description discloses:
The system of any of clauses 1-7, wherein the first temperature is greater than 1100° C.

Clause 9 of the description discloses:
The system of any of clauses 1-8, wherein the second temperature is greater than 400° C.

Clause 10 of the description discloses:
The system of any of clauses 1-8, wherein the second temperature is greater than 600° C.

Clause 11 of the description discloses:
The system of any of clauses 1-8, wherein the second temperature is greater than 800° C.

Clause 12 of the description discloses:
The system of any of clauses 1-11, wherein the second temperature is less than the first temperature by less than 600° C.

Clause 13 of the description discloses:
The system of any of clauses 1-11, wherein the second temperature is less than the first temperature by less than 400° C.

Clause 14 of the description discloses:
The system of any of clauses 1-13, wherein the preheated preform has a uniform temperature greater than 1000° C.

Clause 15 of the description discloses:
The system of any of clauses 1-13, wherein the preheated preform has a uniform temperature greater than 1100° C.

Clause 16 of the description discloses:
The system of any of clauses 1-15, wherein the preheater furnace comprises a maximum operating temperature of 1200° C.

Clause 17 of the description discloses:
The system of any of clauses 1-16, wherein the transfer stage comprises a robot.

Clause 18 of the description discloses:
The system of any of clauses 1-17, wherein the transfer stage is configured to complete the transfer in less than 10 min.

Clause 19 of the description discloses:
The system of any of clauses 1-18, wherein the consolidated preform has a bulk density greater than 1.90 g/cm$^3$.

Clause 20 of the description discloses:
The system of any of clauses 1-19, wherein the preheater furnace comprises:
a body having an automated door attached thereto which when opened provides access to an interior space of the body and when closed prevents access to the interior space of the body;
one or more heating elements and associated insulation located within the body, wherein the one or more heating elements are configured to radiate heat to heat the preform while the preform is located within the interior space of the body;
a box muffle configured to prevent the one or more heating elements and the insulation from contaminating an outer surface of the preform while the preform is located within the interior space of the body;
a rotation-translation mechanism configured to rotate the preform while the preform is located within the interior space of the body; and,
wherein the rotation-translation mechanism is further configured to be retracted to move the preform into the interior space of the body and further configured to be extended to move the preform out from the interior space of the body.

Clause 21 of the description discloses:
A preheater furnace configured to heat a preform, the preheater furnace comprising:
a body having an automated door attached thereto which when opened provides access to an interior space of the body and when closed prevents access to the interior space of the body;
one or more heating elements and associated insulation located within the body, wherein the one or more heating elements are configured to radiate heat to heat the preform while the preform is located within the interior space of the body;
a box muffle configured to prevent the one or more heating elements and the insulation from contaminating an outer surface of the preform while the preform is located within the interior space of the body;
a rotation-translation mechanism configured to rotate the preform while the preform is located within the interior space of the body; and,
wherein the rotation-translation mechanism is further configured to be retracted to move the preform into the interior space of the body and further configured to be extended to move the preform out from the interior space of the body.

Clause 22 of the description discloses:
The preheater furnace of clause 21, wherein the box muffle is composed of fused quartz or other ceramics which would sit on a solid hearth composed of silicon carbide.

Clause 23 of the description discloses:
The preheater furnace of clause 21 or 22, further comprising at least one port located in the body where the at least one port is configured to enable an inert gas to purge the interior space within the preheater furnace.

Clause 24 of the description discloses:
The preheater furnace of any of clauses 21-23, further comprising an air blower configured to move hot air away from the rotation-translation mechanism.

Clause 25 of the description discloses:
A method of processing an optical fiber preform, comprising:
loading a porous preform into a preheater furnace;
heating the porous preform in the preheater furnace to form a preheated preform, the preheated preform having an outer surface at a first temperature, the first temperature exceeding 1000° C.;
transferring the preheated preform from the preheater furnace to a consolidation furnace, the outer surface of the preheated preform cooling to a second temperature during the transferring, the transferring including inserting the preheated preform with the outer surface at the second temperature into the consolidation furnace, the second temperature being greater than room temperature and less than the first temperature.

Clause 26 of the description discloses:
The method of clause 25, wherein the porous preform has a mass greater than 25 kg.

Clause 27 of the description discloses:
The method of clause 25 or 26, wherein the porous preform has a bulk density in the range from 0.35 g/cm$^3$-0.70 g/cm$^3$.

Clause 28 of the description discloses:
The method of clause 25 or 26, wherein the preheated preform has a surface density in the range from 0.35 g/cm$^3$-0.70 g/cm$^3$.

Clause 29 of the description discloses:
The method of any of clauses 25-28, wherein the first temperature is less than 1200° C.

Clause 30 of the description discloses:
The method of any of clauses 25-29, wherein the first temperature is greater than 1100° C.

Clause 31 of the description discloses:
The method of any of clauses 25-30, wherein the second temperature is greater than 400° C.

Clause 32 of the description discloses:
The method of any of clauses 25-30, wherein the second temperature is greater than 600° C.

Clause 33 of the description discloses:
The method of any of clauses 25-30, wherein the second temperature is greater than 800° C.

Clause 34 of the description discloses:
The method of any of clauses 25-33, wherein the second temperature is less than the first temperature by less than 600° C.

Clause 35 of the description discloses:
The method of any of clauses 25-33, wherein the second temperature is less than the first temperature by less than 400° C.

Clause 36 of the description discloses:
The method of any of clauses 25-35, wherein the preheated preform has a uniform temperature greater than 1000° C.

Clause 37 of the description discloses:
The method of any of clauses 25-35, wherein the preheated preform has a uniform temperature greater than 1100° C.

Clause 38 of the description discloses:
The method of any of clauses 25-37, further comprising rotating the porous preform in the preheater furnace.

Clause 39 of the description discloses:
The method of any of clauses 25-38, further comprising sintering the preheated preform in the consolidation furnace.

Clause 40 of the description discloses:
The method of clause 39, further comprising doping or drying the preheated preform in the consolidation furnace.

Clause 41 of the description discloses:
The method of any of clauses 25-40, further comprising forming a consolidated preform from the preheated preform in the consolidation furnace, the consolidated preform having a bulk density greater than 1.90 g/cm$^3$.

Clause 42 of the description discloses:
The method of any of clauses 25-41, wherein the transferring is accomplished with an automated transfer stage.

Clause 43 of the description discloses:
The method of any of clauses 25-42, wherein the transferring occurs in less than 10 min.

Clause 44 of the description discloses:
The method of any of clauses 25-42, wherein the transferring occurs in less than 5 min.

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary. Thus, for example, reference to "an opening" includes examples having two or more such "openings" unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

All numerical values expressed herein are to be interpreted as including "about," whether or not so stated, unless expressly indicated otherwise. It is further understood, however, that each numerical value recited is precisely contemplated as well, regardless of whether it is expressed as "about" that value. Thus, "a dimension less than 10 mm" and "a dimension less than about 10 mm" both include embodiments of "a dimension less than about 10 mm" as well as "a dimension less than 10 mm."

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a method comprising A+B+C include embodiments where a method consists of A+B+C, and embodiments where a method consists essentially of A+B+C.

Although multiple embodiments of the present disclosure have been illustrated in the accompanying Drawings and described in the foregoing Detailed Description, it should be understood that the disclosure is not limited to the disclosed embodiments, but is capable of numerous rearrangements, modifications and substitutions without departing from the disclosure as set forth and defined by the following claims.

The invention claimed is:

1. A method of processing an optical fiber preform, comprising:
loading a porous preform into a preheater furnace;
heating the porous preform in the preheater furnace to form a preheated preform, the preheated preform having an outer surface at a first temperature, the first temperature exceeding 1000° C.;
transferring the preheated preform from the preheater furnace to a consolidation furnace, wherein the preheater furnace is spaced apart and separate from the consolidation furnace, the outer surface of the preheated preform cooling to a second temperature during the transferring, the transferring including inserting the preheated preform with the outer surface at the second temperature into the consolidation furnace, the second temperature being greater than room temperature and less than the first temperature.

2. The method of claim 1, wherein the porous preform has a bulk density in the range from 0.35 g/cm$^3$-0.70 g/cm$^3$.

3. The method of claim 1, wherein the preheated preform has a surface density in the range from 0.35 g/cm$^3$-0.70 g/cm$^3$.

4. The method of claim 1, wherein the first temperature is less than 1200° C.

5. The method of claim 1, wherein the second temperature is greater than 600° C.

6. The method of claim 1, wherein the second temperature is less than the first temperature by less than 600° C.

7. The method of claim 1, wherein the preheated preform has a uniform temperature greater than 1000° C.

8. The method of claim 1, further comprising rotating the porous preform in the preheater furnace.

9. The method of claim 1, further comprising sintering the preheated preform in the consolidation furnace.

10. The method of claim 9, further comprising doping or drying the preheated preform in the consolidation furnace.

11. The method of claim 1, further comprising forming a consolidated preform from the preheated preform in the consolidation furnace, the consolidated preform having a bulk density greater than 1.90 g/cm$^3$.

12. The method of claim 1, wherein the transferring occurs in less than 10 min.

* * * * *